US012563479B2

(12) United States Patent
Das et al.

(10) Patent No.: US 12,563,479 B2
(45) Date of Patent: Feb. 24, 2026

(54) FAST CELL SEARCH AND NEIGHBOR MEASUREMENT EXPLOITING CARRIER AGGREGATION ENABLED RF FRONT-END

(71) Applicant: Intel Corporation, Santa Clara, CA (US)

(72) Inventors: Sajal Kumar Das, Bangalore (IN); Satyajit Kumar Dutta, Bangalore (IN); Har Yash Bahadur, Bangalore (IN)

(73) Assignee: Intel Corporation, Santa Clara, CA (US)

(*) Notice: Subject to any disclaimer, the term of this patent is extended or adjusted under 35 U.S.C. 154(b) by 584 days.

(21) Appl. No.: 17/968,813

(22) Filed: Oct. 19, 2022

(65) Prior Publication Data

US 2023/0164677 A1 May 25, 2023

(30) Foreign Application Priority Data

Nov. 23, 2021 (EP) .................................... 21209835

(51) Int. Cl.
*H04W 48/16* (2009.01)
*H04B 17/318* (2015.01)
(Continued)

(52) U.S. Cl.
CPC .......... *H04W 48/16* (2013.01); *H04B 17/318* (2015.01); *H04W 24/10* (2013.01); *H04W 36/0088* (2013.01)

(58) Field of Classification Search
None
See application file for complete search history.

(56) References Cited

U.S. PATENT DOCUMENTS

2009/0131047 A1* 5/2009 Amerga ................ H04W 48/16 455/434
2010/0062764 A1* 3/2010 Aiouaz ................ H04W 48/16 455/434

(Continued)

FOREIGN PATENT DOCUMENTS

EP 3866513 A1 8/2021

OTHER PUBLICATIONS

European Search Report issued for the corresponding European patent application No. 21 20 9835, dated May 23, 2022, 10 pages (for informational purposes only).

*Primary Examiner* — Ayaz R Sheikh
*Assistant Examiner* — Christopher R Davis
(74) *Attorney, Agent, or Firm* — Viering, Jentschura & Partner mbB

(57) ABSTRACT

The present disclosure presents methods and devices configured to exploit the carrier aggregation (CA) capabilities of a radio frequency (RF) front-end (FE) of a terminal device to perform a frequency scan in cell search operations. Based on the CA options of the RF FE of the terminal device, one or more tables are stored in a memory of the terminal device, where the tables include frequency band search sets including multiple frequencies that can be scanned by the terminal device in parallel based its CA capabilities. When a frequency scan for a cell search operation is triggered, a processor of the terminal device is configured to retrieve one of the tables from the memory and perform the frequency scan of the cell search operation based on the frequency band search sets retrieved from the table in the memory.

12 Claims, 14 Drawing Sheets

(51) Int. Cl.
*H04W 24/10* (2009.01)
*H04W 36/00* (2009.01)

(56) References Cited

U.S. PATENT DOCUMENTS

| | | | | |
|---|---|---|---|---|
| 2014/0179311 | A1* | 6/2014 | Liang | H04W 48/16 455/434 |
| 2015/0092709 | A1 | 4/2015 | Su | |
| 2016/0119857 | A1* | 4/2016 | Mohan | H04W 48/00 455/434 |
| 2021/0195483 | A1 | 6/2021 | Youtz et al. | |
| 2021/0409977 | A1* | 12/2021 | Dussmann | H04L 45/66 |

* cited by examiner

FAST CELL SEARCH AND NEIGHBOR MEASUREMENT EXPLOITING CARRIER AGGREGATION ENABLED RF FRONT-END

RELATED APPLICATION(S)

This application claims priority to European Application No. 21 209 835.4 filed on Nov. 23, 2021, the entirety of which is incorporated herein by reference.

TECHNICAL FIELD

Various aspects relate generally to wireless communications.

BACKGROUND

Driven by an always-connected user experience, terminal devices like laptops, tablets, and smart phones host cellular modems supporting Fourth Generation (4G) and/or Fifth Generation (5G) technology on their platforms. Today, with the rapid growth of highspeed 4G and 5G networks, the cellular modem has become an integral part of personal computer (PC), notebook, and tablet devices, usually as an M.2 interconnected Wireless Wide Area Network (WWAN) data-card module.

In order to connect to 4G and 5G networks, terminal devices must first perform a cell search frequency scan to find suitable cells to camp on, and 4G and 5G networks support a high number of frequency bands that the terminal device must scan. Up to now, this cell search frequency scan has been done in a sequential manner, i.e., search one frequency band after another mainly due to the need of parallel operation of multiple RF front-end circuits to cater to different frequency bands. However, due to the ever-increasing number of supported frequency bands, the cell search frequency scan can take a long amount of time.

The present disclosure provides methods and devices that reduce the time needed to perform the cell search frequency scan and reduce the cell search and measurement operation time needed in order to camp on a cell of a network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the description, various aspects of the disclosure are described with reference to the following drawings, in which.

DESCRIPTION

The following detailed description refers to the accompanying drawings that show, by way of illustration, specific details, and aspects in which the disclosure may be practiced.

The present disclosure provides devices and methods that take advantage of carrier aggregation (CA) capabilities of the radio frequency (RF) front-end (FE) circuitry found in 4G and 5G devices and exploits the CA capabilities of the RF FE for frequency scanning in cell selection, reselection, handover, or neighbor cell measurement procedures. The methods and devices discussed herein provide for an implementation of a method for scanning multiple frequency bands (e.g., 2 or more) in parallel by utilizing the RF FE CA architecture. The cell search is performed using an algorithm which leverages prior knowledge of the device CA hardware (HW) capabilities, available operator frequency, neighbor cells, and/or possible frequency band combinations. This helps in speeding up the frequency scan and cell search procedure and leads to a better user experience.

Once a cellular modem of a device is powered on or during procedures such as cell reselection, cell handover, or neighbor cell measurements, the cellular modem locks to different carrier frequencies to perform cell search or measurement operations. This includes the cellular modem locking (i.e., tuning) to the appropriate RF carrier frequency and performing the carrier frequency measurements to determine which cells to camp on. Performing the carrier frequency measurements generally includes measuring the Received Signal Strength Indicator (RSSI) and if the RSSI is greater than a threshold, then the cellular modem performs synchronization and system information decoding. If the cell is suitable and satisfies the cell selection criteria, then the cellular modem camps to that suitable cell. This operation is illustrated in FIG. 1.

Figure 1:
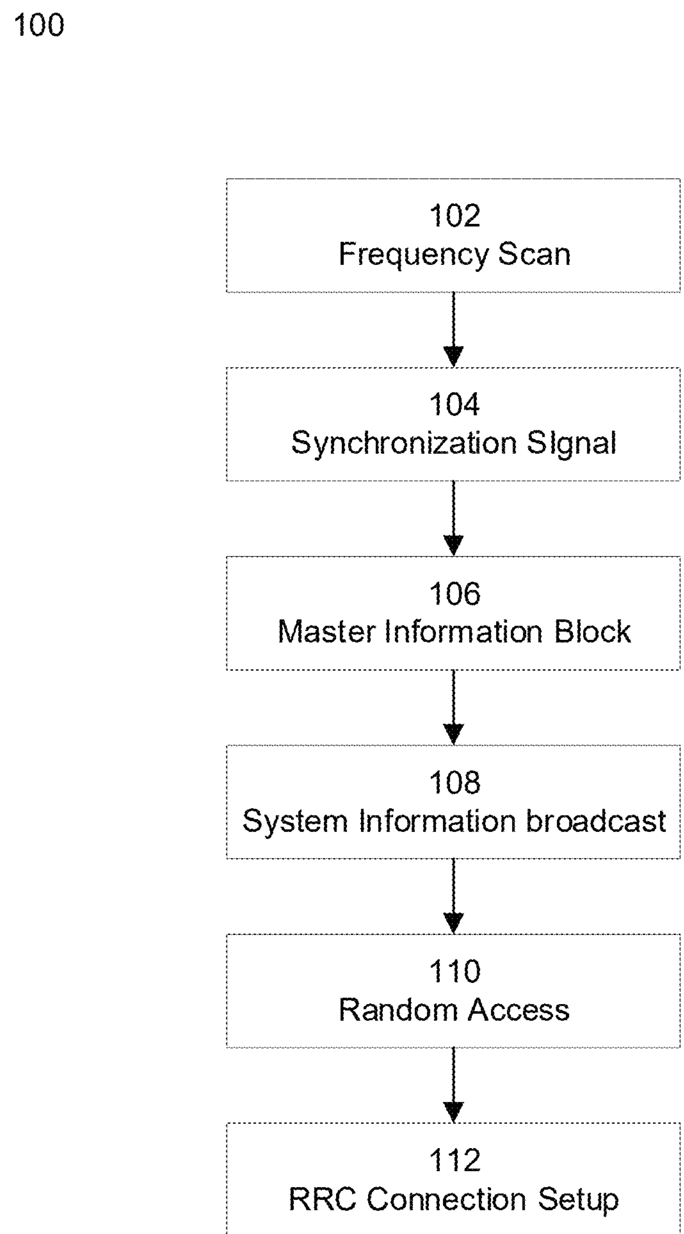
FIG. 1 exemplarily shows a flowchart for a cell search sequence according to the present disclosure.

FIG. 1 shows a flow diagram 100 illustrating the cell search sequence according to the present disclosure. It is appreciated that flow diagram 100 is exemplary in nature and may thus be simplified for purposes of this explanation.

First, a frequency scan 102 is conducted. This scan is frequency based on a synchronization raster which is defined in 3GPP TS 38.104. After this scan, synchronization signals are detected 104. The Primary Synchronization Signal (PSS) and the Secondary Synchronization Signal (SSS) are obtained to achieve the cell ID, symbol timing, and the frequency location to acquire the Physical Cell ID (PCI). Once the terminal device (i.e., the UE) successfully decodes the Physical Broadcast Channel (PBCH), the UE attempts to reach the Master Information Block (MIB) and Synchronization Signal Block (SSB) beam information's and time frequency 106. The UE then reads System Information Block (SIB) 1 to obtain the initial uplink bandwidth part (BWP) information, channel configuration in the BWP, time division duplex (TDD) cell subframe configuration used in semi-static scheduling, and other necessary information for the UE to access the network and the search space information for acquiring other system information (SI) 108. In 110, the UE performs the Random-Access Channel (RACH) process, where the uplink synchronization between the UE and the base station (e.g., gNodeB in 5G) is performed and the base station allocates the uplink resources to the UE. In 112, the Radio Resource Control (RRC) Connection Setup is performed according to TS 38.330. This includes the RRC setup and the UE Context setup and admission and signaling radio bearer (SRB) 1 resource allocation.

This cell search operation may quite some time as 4G and 5G cellular devices support a high number of Third Generation Partnership Project (3GPP) bands, which may number around 40 frequency bands. Recently, the 3GPP has added many new RF bands with the introduction of 5G. In addition to the supported bands for 4G, 5G introduces new operating bands in FR1 up to 6 GHz and up to 39 GHz in FR2. In future cell generations (i.e., beyond 5G), there will be more RF bands in the licensed and unlicensed frequency bands that will need to be scanned since there is an ever-increasing demand for radio resources. Each RF band that is scanned during the frequency scan may include several RF frequency carriers ($N_f$). This means that there are many carrier frequencies ($N_{RFBand} \times N_f$) that the UE will have to scan.

In the cell selection process, a UE may scan all the supported frequency bands (i.e., perform a full scan) in scenarios such as after booting up if there is no prior frequency scan data stored in its memory or when there is no data available, when the UE was off and moved to a different geographical location, or when a new Subscriber Identity Module (SIM) is introduced. Apart from these scenarios, the UE may also periodically scan neighbor cells in order to determine whether it is camped on the best cell. This requires performing the cell reselection process periodically, which itself includes periodically measuring the cell frequencies. In 5G networks (and beyond), since the size of cells are decreasing, the number of cells for a given coverage area is increasing. This puts more pressure on the UEs to scan, measure, and prioritize available frequencies in a limited amount of time. Furthermore, due to their mobility, even when a UE moves a short distance, the UE may need to perform cell reselection.

Current known methods for the cell search include performing the cell search sequentially across each of the supported bands. This may take quite a long time and be in the order of 10s of seconds or more. This leads to a longer boot-time connection and to the user waiting for a long time to get connected to the network. Similarly, neighbor cell search operations for impending handovers also take a longer amount of time since a larger number of bands need to be searched. This degrades the user experience.

Today, many 4G and 5G devices such as smart phones, tablets, or PCs are capable of inter-band non-contiguous Carrier Aggregation (CA). The RF FE (i.e., the RF integrated circuit (IC) architecture) enable such devices to receive multiple carrier frequencies in different RF bands in parallel. The present disclosure provides a mechanism that exploits the CA-enabled RF FE and adds a new RF quadrature (IQ) width-based quick decision-making technique to reduce the time needed for cell search and measurement operations.

Figure 2:
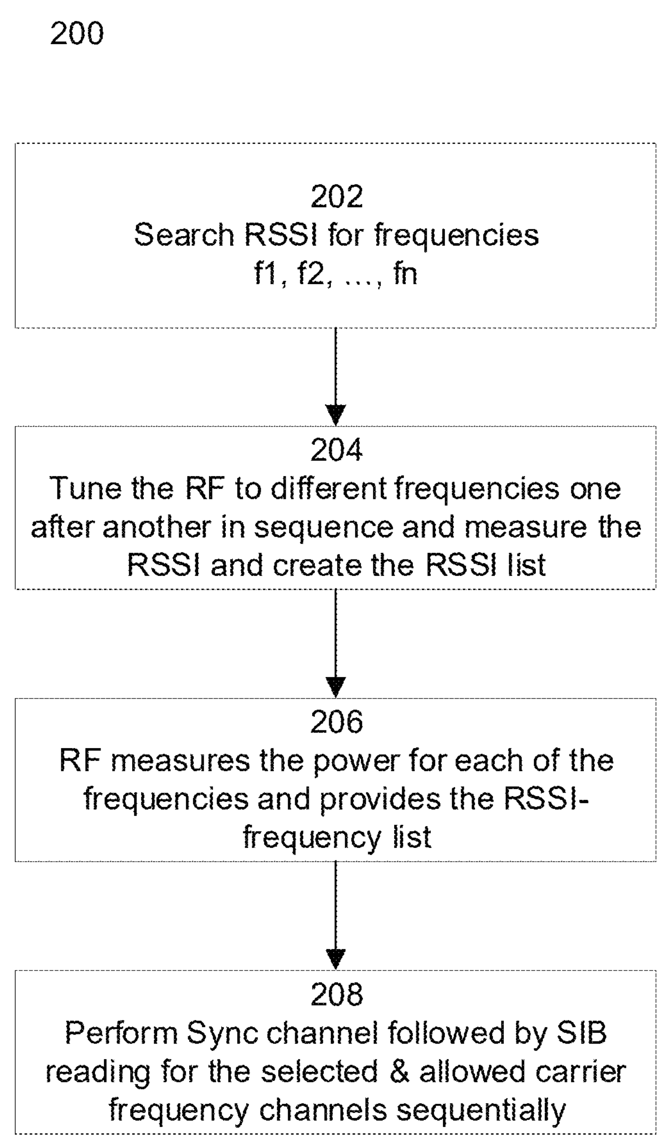
FIG. 2 exemplarily shows a flowchart for a cell search operation according to a legacy method.

FIG. 2 shows a flowchart 200 illustrating a method for cell search and measurement operations for a legacy method. As shown in 202-204, a sequential search operation is employed where the local oscillator (LO) in the RF FE is tuned to each frequency to be searched one after another. In other words, the device uses only one Rx path for carrier frequency reception during the frequency scan at a time. The device sequentially tunes the LO to the different frequencies in different bands and then measures the RSSI for each of the frequencies 206. Later, if the carrier RSSI is more than a threshold, the cell search operation (Synchronization and SIB reading) is performed on those frequencies for camping to the cell 208.

Figure 3:
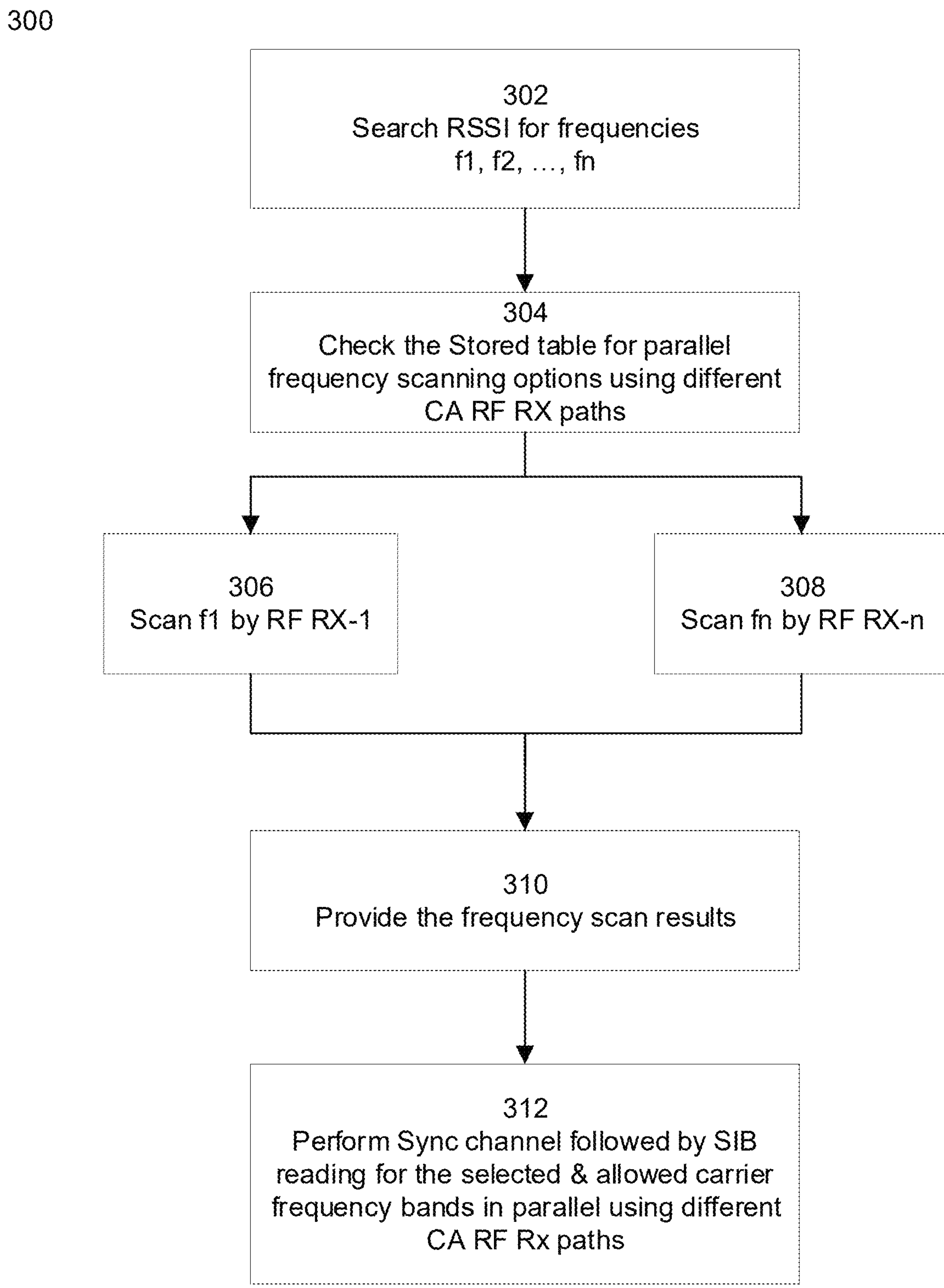
FIG. 3 exemplarily shows a flowchart for a cell search operation according to the present disclosure.

FIG. 3 shows a flowchart 300 illustrating a method for cell search and measurement operations according to the present disclosure. It is appreciated that flowchart 300 is exemplary in nature and may thus be simplified for purposes of this explanation.

The method includes checking a memory for a stored table for parallel frequency scanning options using different CA RF receive (Rx) paths 304. Examples of the stored table are discussed later on this disclosure. The stored table contains a set of frequency bands including a plurality of frequency band search sets. Each frequency band search set includes one or more frequency bands to be searched, and one or more of these plurality of frequency band search sets are parallel search sets including a plurality of frequency bands to be searched in parallel utilizing a plurality of simultaneously configurable RX paths of a RF FE circuitry exploiting the RF hardware capability of the device. In some aspects, the parallel search sets may also be based on a bandwidth (BW) of the frequency bands to be searched.

Based on the retrieved set of frequency bands from the stored table, cell search frequency scan can include multiple frequencies in parallel as shown in 306-308. This includes configuring multiple Rx paths of the RF FE to perform the frequency scans in parallel utilizing the CA RF FE Rx paths. In other words, the CA capabilities of the terminal device are exploited to provide for the parallel frequency scanning in the cell search operation. This parallel frequency scanning helps to reduce the frequency scan and cell search operation drastically. The amount of search time saved using this proposed method is presented later on in this disclosure.

Once the frequency scan results are obtained in 310, the synchronization (sync) channel followed by the SIB reading for the selected frequency bands that satisfy a signal quality criterion (e.g., RSSI above a threshold) may be performed in parallel using the CA RF FE Rx paths 312.

The present disclosure also identifies another alternate technique for reducing the frequency scan and cell search operation. This alternate technique includes scanning several carrier frequencies (each of bandwidth BW) and detecting the power spectrum of the received samples. This may be implemented by collecting the quadrature (IQ) samples over a wide band W. The wide band W=N×BW indicates that the N number of channels, each of bandwidth BW, are collected at one shot. The IQ samples of W are then subjected to Fast Fourier transforming (FFT) and converted to the frequency domain. Then, the power peak is searched for different channels (each of bandwidth BW) over the entire wide bands W. This alternate technique, however, may present several difficulties compared to the parallel scanning and cell search operations disclosed herein.

A first possible difficulty is that the wide band W should not be too wide, e.g., W may be in the order of 20 MHz. However, for faster frequency scanning, the wide band W needs to be larger. But if W is larger, the sampling frequency increases. This may cause the power spectrum to be flat and obtaining clear frequency peaks over the spectrum may be difficult. A second possible difficulty may be found in the IQ samples after FFT and windowing and power spectrum smoothing. The peak power values for different carrier frequencies may become difficult to distinguish clearly, especially if there is a high signal power frequency present in the spectrum that will proportionally reduce the power peak of others. Because of these difficulties, the method of wide band frequency search may not be as effective as the methods disclosed herein.

In a simple and theoretical sense, for $N_{fc}$ parallel frequency scan and cell search operations, we require $N_{fc}$ number of such blocks in parallel. In reality, this is not feasible since the RF FE with this number of blocks in parallel would be bulky and expensive. The present disclosure provides a technique which efficiently utilizes the existing RF FE blocks in the receiver side to provide parallel search capability. Many 4G and 5G devices already support CA features where the RF FE is already implemented for receiving two or more frequencies in parallel in the same or in different bands. Generally, the CA features are used for traffic or data channel reception in dedicated mode. The present disclosure leverages these same blocks used in CA for executing the parallel frequency scan and cell search operations which may be performed in idle mode.

Cell search time is a function which directly translates to user experience since a user would like their device camp on to a network in the least amount of time. The present disclosure reduces the current camp-on duration by a significant percentage. This translates to significantly improved Key Experience Indictors (KEIs) for platforms that support connected devices. Advantages of the present disclosure include: (1) a much faster cell search scan (e.g., ~37% time reduction in full scan scenarios) and cell selection, (2) faster neighbor cell measurements, (3) faster boot time and network connection, (4) better user experience, (5) better sleep and mobility management, and (6) power consumption reduction (by skipping power measurements when the IQ samples of the signal are too weak).

Figure 4:
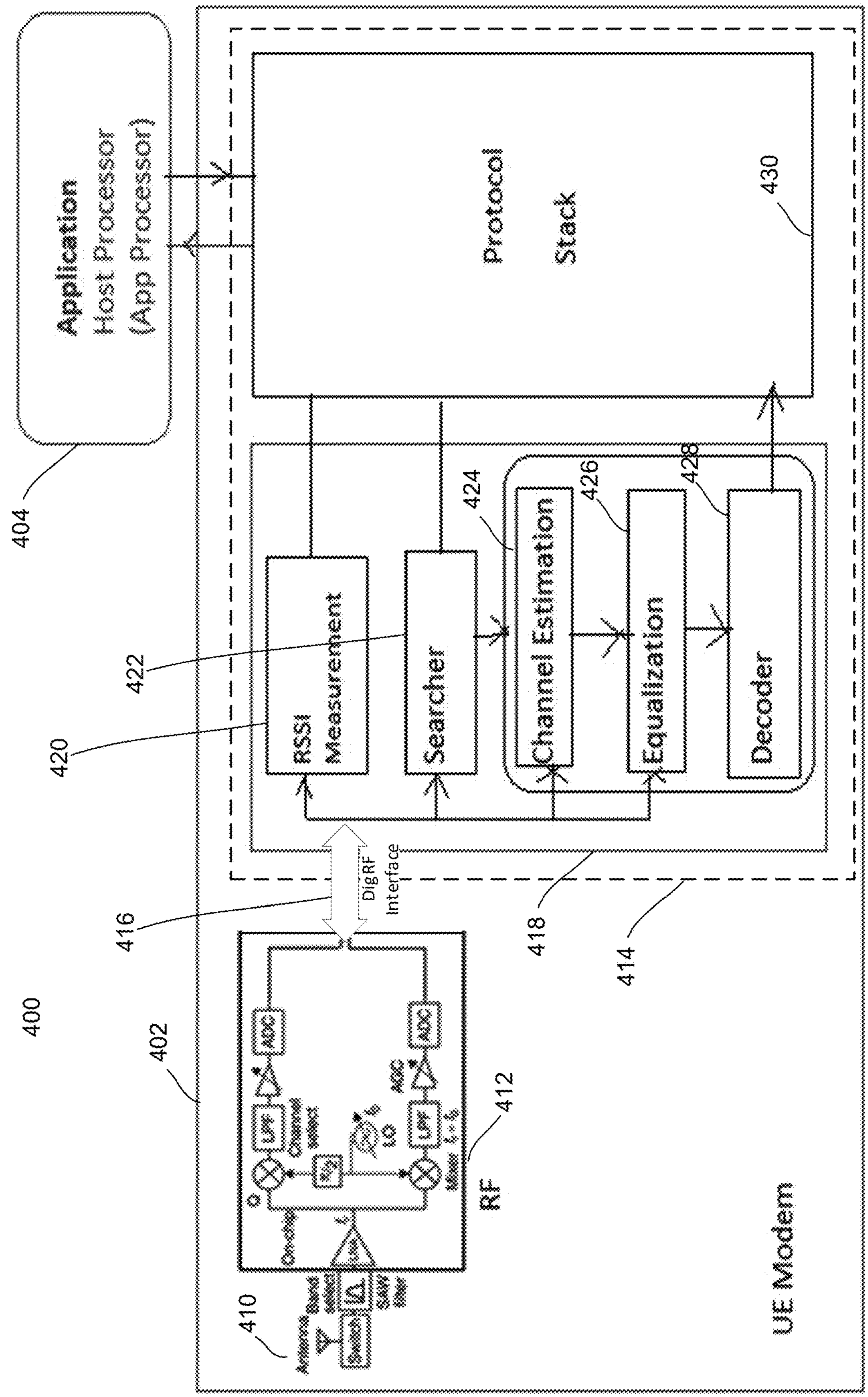
FIG. 4 exemplarily shows a schematic diagram of receiver components according to the present disclosure.

FIG. 4 is a device schematic diagram 400 illustrating the components involved in the frequency scan and cell operations according to the present disclosure. It is appreciated that device schematic diagram 400 is exemplary in nature and may thus be simplified for purposes of this explanation.

A UE modem 402 and an application processor 404 are depicted. UE modem 402 may be in charge of receiving and transmitting radio frequency signals via antenna 410 as well as signal processing of these radio frequency signals. UE modem 402 may include an RF receiver 412 including the RF FE circuitry which may include a low-noise amplifier (LNA), one or more mixers, a local oscillator (LO), one or more low-pass filters (LPFs), one or more automatic gain control (AGC) circuits, and one or more analog-to-digital converters (ADCs). These components serve to process the received RF signals and convert them to digital samples to be sent via digital RF interface (DigRF Interface) 416 to the baseband processor 414 (i.e., baseband modem). The RF receiver 412 tunes to different RF frequencies using the LO to receive, amplify, and down-convert the RF frequencies to lower frequencies. The ADC of the RF receiver unit 412 samples and passes the IQ samples to the baseband processor 414. The baseband processor 414 may include a digital signal processor (DSP) 418 with an RSSI measurement unit 420 to measure the RSSI in the frequency scanning process. Later, if the RSSI is high for a frequency of the frequency scan, the Searcher 422 performs the cell search operation for the given frequency. The Searcher 422 includes a correlator which takes the IQ samples and searches for different cell synchronization (i.e., PSS and/or SSS) signals. Once the synchronization signal is detected by the Searcher 422 on a given frequency, the next broadcast channel (i.e., the Physical Broadcast Channel (PBCH)) is read for obtaining the system information (SI) to camp on the detected best cell corresponding to the given frequency. The frequency scan and the RSSI measurements of different RF frequencies of the cell search operation are performed during the initial connection to a network, e.g., during the camp on time or later during periodic cell selection/re-selection and cell handovers.

Other components of the DSP 418 may include a Channel Estimation unit 424, an Equalization unit 426, and a Decoder 428. The baseband modem 414 may further include a protocol stack controller 430 configured to execute higher levels of the protocol stack for a given RAT and interface with the Application Processor 404.

Figure 5:
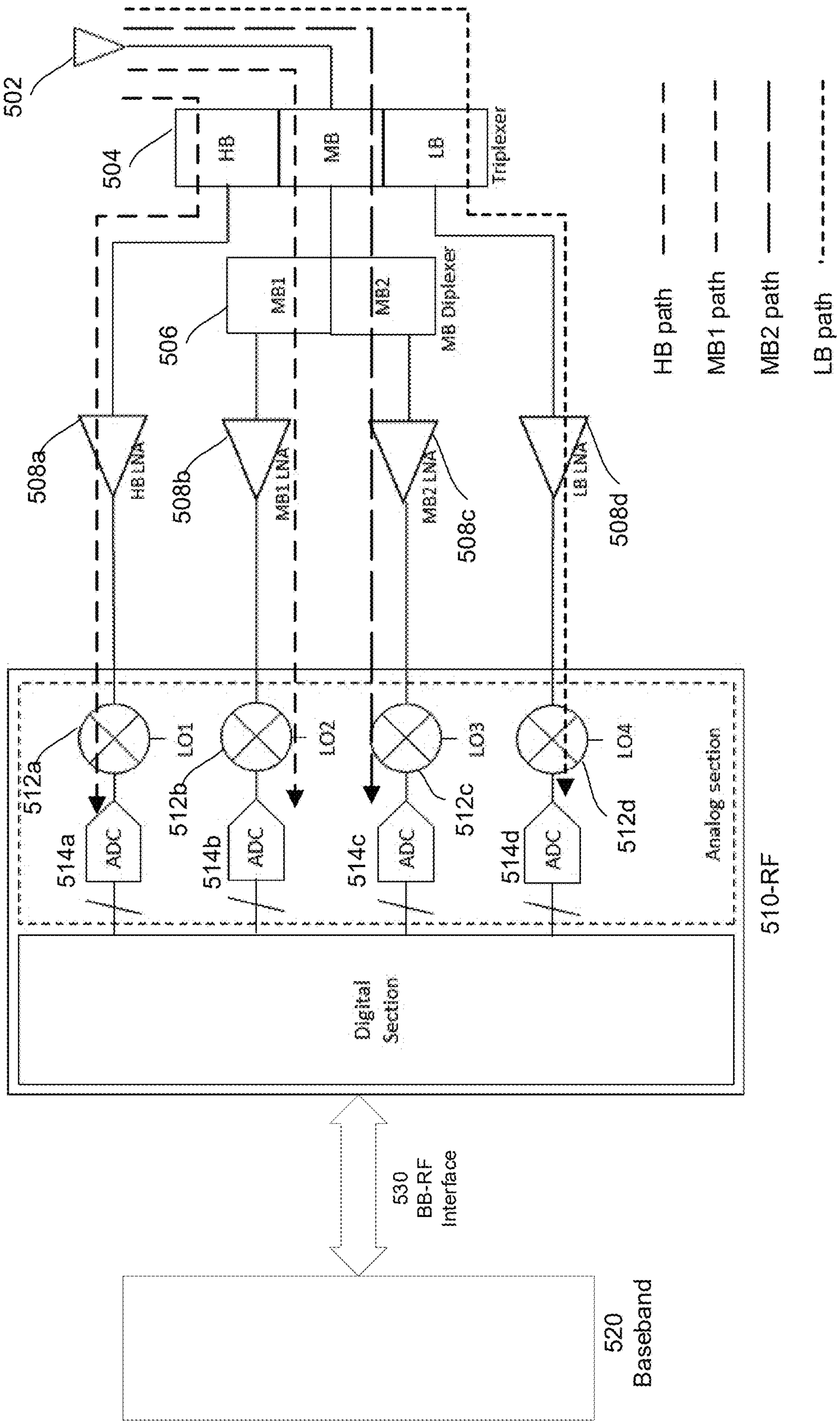
FIG. 5 exemplarily shows a schematic diagram of a RF FE architecture for a device supporting CA according to the present disclosure.

FIG. 5 shows an RF FE architecture block diagram 500 for frequency scanning and cell search measurements that exploit the CA capabilities of the RF FE according to some aspects. It is appreciated that RF FE architecture block diagram 500 is exemplary in nature and may thus be simplified for purposes of this explanation to illustrate the plurality of simultaneously configurable receive paths of the RF FE circuitry according to the present disclosure.

Generally, the RF FE is a term for the circuitry and components between a receiver's antenna input up to and including the mixer stage. In digital receivers such as those used in wireless devices with cellular or WLAN capabilities, the RF FE may be defined as the circuitry and components from the antenna to the analog-to-digital converter (ADC) which digitizes the signal for further processing by the baseband modem.

RF signals are received at antenna 502. Here, four types of signals are shown: a high-band (HB) signal, a first mid-band (MB1) signal, a second mid-band (MB2) signal, and a low-band (LB) signal. Triplexer 504 separates the received RF signals into a high-band (HB) path, a mid-band (MB) path, and a low-band (LB) path. MB Diplexer 506 further separates the MB path into MB1 and MB2. Each of HB, MB1, MB2, and LB then passes through a respective low-noise amplifier **508*a*-508*d* before being mixed with a respective LO signal (LO1-LO4) at mixers 512*a*-512*d* and converted into the digital domain by ADCs 514*a*-514*d* for transmitting to the Baseband IC 520 via the baseband-RF (BB-RF) interface 530**.

In this manner, FIG. 5 illustrates four simultaneously configurable receive paths of the RF FE circuitry: a HB Rx path, two MB Rx paths (MB1 and MB2), and a LB Rx path. While four simultaneously configurable paths are shown in FIG. 5, it is appreciated that this number serves as an example and that the RF FE architecture may include other numbers of simultaneously configurable receive paths, e.g., 2, 3, or 5, or other types of band combinations based on the RF FE architecture for a particular device.

As previously discussed, the hardware and/or software necessary to exploit these Rx paths may already be present on the terminal device for purposes of implementing CA features in dedicated mode. Accordingly, no additional hardware may be needed to implement the parallel frequency scanning techniques of the present disclosure.

The present disclosure provides improved methods for the frequency scan and in the cell search operation. The first part discusses the general idea for executing the frequency scan in the cell search in parallel. The second part presents an algorithm to show how this parallel frequency scan in the cell search can be executed based on the operator's band allocation. The third part presents a baseband technique to quickly reject false cells to further speed up the cell selection process.

In the first part, further details for the method of the parallel frequency scan in the cell search are presented. Modern 4G and 5G cellular devices support data calls on single bands as well as on multiple bands, where calls on multiple bands (simultaneous reception) is performed utilizing CA hardware (HW). The simultaneous reception of multiple bands is illustrated in FIG. 5. The present disclosure opens up the RF Rx paths intended for CA and utilizes them during the frequency scan and cell search operation process.

By contrast, in the legacy method, the frequency scan is performed on one band at a time, i.e., only one of the paths shown in FIG. 5 is activated depending on whether the band being searched is a HB, MB, or LB. A raster scan is performed across the selected band and typically includes a search window in the range of about 5 MHz. For example, considering Band 1 in 3GPP with a bandwidth of 60 MHz, the search will be executed for 60/5=12 settings of the LO. This implies 12 time intervals. Band 3 has a bandwidth of 75 MHz, so it will require 75/5=15 settings of the LO, i.e., 15 time intervals. So, in the legacy method, the LO has to be set for 12+15=27 time intervals to complete the frequency scan for Bands 1 and 3.

The proposed method speeds up this process by performing parallel reception of Band 1 and Band 3. For example, with respect to FIG. 5, Bands 1 and 3 may correspond to MB1 and MB2, respectively. Accordingly, each of Bands 1 and 3 may be received in parallel on two different LO chains where Band 1 is served by LO2 and Band 2 is served by LO3. Each will have its own automatic gain control (AGC) and RSSI measurement. In the current example, Band 1 needs 12 time intervals for the LO to perform the raster scan and Band 3 needs 15 time intervals. Since the frequency scan can be performed in parallel using LO2 and LO3, the amount of time needed to complete the scan for Band 1 and Band 3 will be 15 time intervals, or the max (12, 15). This is a significant improvement over the legacy method where the frequency scan for Bands 1 and 3 takes 27 time intervals.

The frequency scan in the cell search can be made even faster if CA cases involving more bands are considered.

For example, in a 4-CA case with Bands 1, 3, 7, and 8, Bands 1 and 3 are MBs, Band 7 is a HB, and Band 8 is a LB. As shown in FIG. 5, it is possible to support such a combination based on the RF FE architecture for the illustrated example. Therefore, during the frequency scan in the cell search, the technique of the present disclosure opens up all 4 Rx paths shown in FIG. 5 to collect the IQ samples for each of these four bands at the same time. If performed in sequence, according to the legacy method, the frequency scan for these four bands would take 12+15+14+7=48 time intervals to complete. When the search is run in parallel according to the methods of the present disclosure, it requires only max (12, 15, 14, 7)=15 time intervals to complete the search of all four bands.

Therefore, based on the plurality of simultaneously configurable receive paths of the RF FE of a particular terminal device, a table may be generated for the frequency scan in the cell search and stored in a memory, where the table factors in the CA combinations supported by the RF FE HW. The information in this table may be retrieved for the frequency scan in the cell search process to select which combinations of bands can be searched in parallel utilizing a plurality of simultaneously configurable (based on the LOs) Rx paths of the RF FE.

The cell search time reduction provided by this disclosure may be significant since performing the search in parallel according to the options afforded by the CA FE will ensure a much faster execution of the cell search. Table 1 shows an example of detailed calculations for a CAT16 4G device for a global single HW design that supports 21 bands. In Table 1, the scanning granularity is 5 MHz and the time dwelt on per point is 24 ms.

TABLE 1

| Sequential Full Scan (Traditional) | | | Parallel Scan technique (this disclosure) | |
|---|---|---|---|---|
| Band search sequence | Bandwidth (MHz) | LO lock points | Band search set | LO lock points |
| 1 | 60 | 12 | 1-3-7-8 | 15 |
| 2 | 60 | 12 | 2-12-66 | 18 |
| 3 | 75 | 15 | 25-26 | 13 |
| 4 | 45 | 9 | 41-42 | 40 |
| 5 | 25 | 5 | 13-48 | 30 |
| 7 | 70 | 14 | 28-40 | 20 |
| 8 | 35 | 7 | 20 | 6 |
| 12 | 17 | 3.4 | 39 | 8 |
| 13 | 10 | 2 | 43 | 40 |
| 20 | 30 | 6 | 71 | 7 |
| 25 | 65 | 13 | | |
| 26 | 35 | 7 | | |
| 28 | 45 | 9 | | |
| 39 | 40 | 8 | | |
| 40 | 100 | 20 | | |
| 41 | 194 | 38.8 | | |
| 42 | 200 | 40 | | |
| 43 | 200 | 40 | | |
| 48 | 150 | 30 | | |
| 66 | 90 | 18 | | |
| 71 | 35 | 7 | | |
| Total Lock points | | 316.2 | | 197 |

Number of LO lock points reduced 119.2
% improvement in time 37.7

In Table 1, it is noted that Band 5 is a sub-band of Band 26 and is thus covered in the scan of Band 26. Similarly, Band 4 is a sub-band of Band 66 and Band 17 is a sub-band of Band 12. Since a scan of Bands 66 and 12 are covered elsewhere, a separate scan of Bands 4 and 17 is not needed.

As shown in Table 1, by utilizing the CA combinations available based on the CA FE circuitry, the method of the present disclosure is able to reduce the cell search time by over 37% compared to the sequential scan of the legacy method. In this example, parallel searches may be run for the following combinations of bands: 1-3-7-8, 2-12-66, 25-26, 41-42, 13-48, and 28-40. It is appreciated that not all the bands in the frequency scan may be included in the parallel search sets in the frequency scan, and these bands may be scanned individually, e.g., bands 20, 39, 43, and 71 in Table 1.

For purposes of this disclosure, with reference to the Parallel Scan technique section in Table 1, the term "set of frequency bands" corresponds to all the frequency bands in the Band search set column. The term "frequency band search set" corresponds to each row in the Band search set column, i.e., there are a plurality of frequency band search sets corresponding to all the rows. The term "parallel search sets" corresponds to those rows in the Band search set column with more than one frequency band, i.e., the parallel search sets include Band search sets 1-3-7-8 up to 28-40. It is these "parallel search sets" that include multiple frequency bands that can be scanned in parallel during the cell search frequency scan.

In the second part, further details for the method of optimized band selection for parallel search are presented. This section discusses how the frequency scan cell search operation can be further improved based on whether the search is being executed for a full scan after boot or for a case where the operator and geography is known from the SIM. Tables may be created listing out search sequences based on different scenarios and these tables may be stored in a memory.

For a full scan search from boot, a table is created to define the search sequence. To create the table, a first criteria may be to group together those bands whose bandwidths are comparable. For example, bands 41 and 42 have bandwidths that are 194 MHz and 200 MHZ, respectively. So, if a device supports CA_41A-42A, these two bands may be searched concurrently to ensure that the searches on both bands will be completed nearly simultaneously. In other words, in addition to being based on the plurality of simultaneously configurable receive paths of a RF FE circuitry, the frequency bands to be included in the parallel search sets may also depend on the respective bandwidths of the of frequency bands in the parallel search set.

Table 2 shows an example of a search sequence for frequency bands that is created based on the existing CA combinations with similar bandwidths on each component carrier. Each number in the table corresponds to a Band number according to the 3GPP specifications.

TABLE 2

| Full Scan frequency band search sets |
|---|
| 1-3-7-8 |
| 2-4-5 |
| 25-26 |
| 41-42 |
| 13-48-66 |
| 12-30 |
| 28-40 |
| 14 |
| 20 |
| 34 |
| 39 |
| etc. |

Note that in Table 2, the latter part of the table (starting at the row for Band 14) contains bands which could not be grouped together since no CA combinations based on the RF FE exists between them.

In addition to creating a table based on a full scan as detailed above, tables may be created based on a known network operator and the bands supported by that operator that are stored in the device. In this manner, search tables can be created based on the prior-known information about the operator so that all bands supported by that operator are covered by a minimum number of search sets based on the CA combinations. Two such operator-based search tables are detailed below.

Operator A in Country X may support LTE bands 1, 7, 20, 28, 42, and 43. Operator B in Country Y may support LTE bands 1, 2, 3, 4, 5, 7, 8, 12, 13, 20, 25, 26, 28, 38, 39, 40, 41, 42, 43, 46, 48, 66, and 71. A search table may be created for each operator based on the possible CA HW combinations. Table 3 shows an example of a search table for Operator A and Table 4 shows an example of a search table for Operator B. Each table also shows the corresponding time improvement compared with the sequential search of the legacy method. The No. of points corresponds to the LO settings to perform the scan for the Band Search sequence set.

TABLE 3

| Operator A | | |
|---|---|---|
| Band search sets | No. of points | No. of points if sequential (legacy) |
| 1-7-28 | 14 | 35 |
| 20 | 6 | 6 |
| 42 | 40 | 40 |
| 43 | 40 | 40 |
| Total | 100 | 121 |

Time points saved 21
% improvement in time 17.36

TABLE 4

| Operator B | | |
|---|---|---|
| Band search sets | No. of points | No. of points if sequential (legacy) |
| 1-3-7-8 | 15 | 48 |
| 2-12-66 | 18 | 33.4 |
| 25-26 | 13 | 20 |
| 41-42 | 40 | 78.8 |
| 13-48 | 30 | 32 |
| 4-71 | 9 | 16 |
| 28-40 | 20 | 29 |
| 20 | 6 | 6 |
| 39 | 8 | 8 |
| 43 | 40 | 40 |
| Total | 199 | 311.2 |

Time points saved 112.2
% improvement in time 36.05

As shown in Table 3 for Operator A, only Bands 1, 7, and 8 were deemed as a possible combination for the parallel frequency scan in the cell search operation. Even so, the improvement in time is still over 17%. Note that even though Bands 1, 3, 7, and 8 were considered for Operator B as it gave the most equitable bandwidth clustering, Bands 1, 7, and 28 were considered for Operator A since Operator A does not support Bands 3 or 8. It may also be seen that the methods described herein provides greater benefits (e.g., greater reductions in time in the frequency scan for the cell search) as the number of supported bands increases.

Based on a priori known information, tables for search sequences as shown above (i.e., for a full scan and/or for operator-based scans) may be designed based on the Rx paths based on the possible CA combinations for a given terminal device and may be integrated with the modem software (e.g., stored in a non-volatile memory (NVM) of a cellular modem). Updating the tables may be possible through an over-the-air firmware upgrade.

Figure 6:
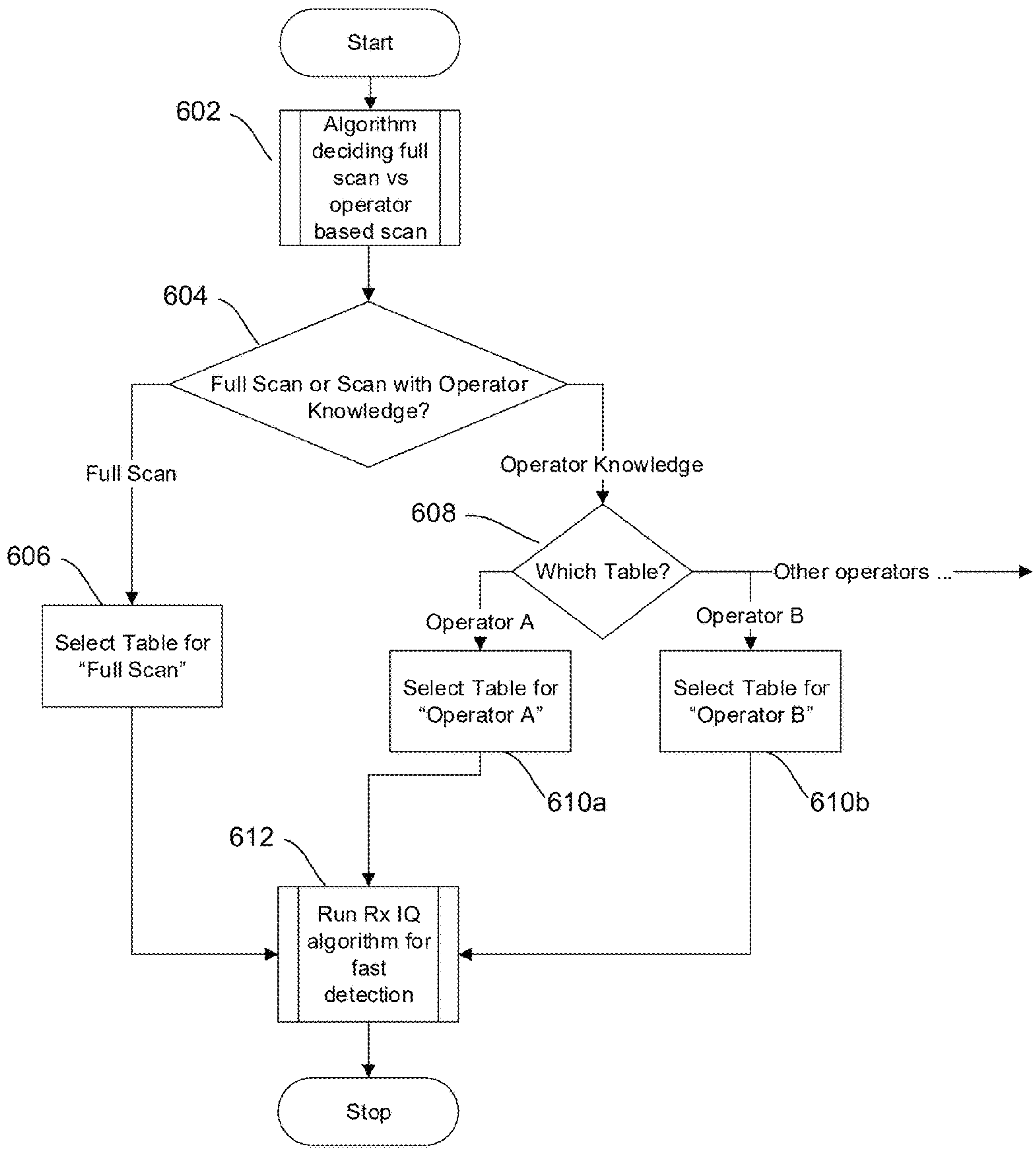
FIG. 6 exemplarily shows a flowchart for a cell search operation according to the present disclosure.

FIG. 6 shows a flowchart 600 detailing a method for cell selection implementing a parallel frequency scan according to the present disclosure. It is appreciated that flowchart 600 is exemplary in nature and may thus be simplified for purposes of this explanation. The algorithm shown in flowchart 600 may be run during a frequency scan in a cell search after boot-up, during a neighbor cell scan, during a cell handover process, or during a cell selection/re-selection process.

To start the search shown in flowchart 600, the SIM is read first. In 602, an algorithm deciding between a full-scan vs. operator-based scan is run to decide whether to perform a full scan or a scan with operator knowledge in 604. This may include determining whether the SIM has prior information for an operator based on a geographical region. If there is no prior information, then a full scan may be run, and a table for the Full scan may be selected in 606.

This table for the full scan may include information for a set of frequency bands, where the set of frequency bands corresponds to the frequency bands supported by the device. The set of frequency bands may include a plurality of frequency band search sets, where each frequency band search set includes one or more frequency bands. One or more of these frequency band search sets may be parallel search sets including a plurality of frequency bands to be searched in parallel utilizing a plurality of simultaneously configurable receive paths of an RF FE circuitry that the processor is coupled to and/or respective bandwidths of the plurality of frequency bands in the parallel search set.

If there is prior known information for the operator based on a given geographic location and the reading of the SIM, then a table based on the operator knowledge may be retrieved in 608. The appropriate table may be selected depending on the operator 610*a*-610*b*, and the frequency scan in the cell search may be run based on the retrieved table. The table for the operator-based scans may be similarly constructed as the table in the Full scan based on the possible combinations of Rx paths of the RF FE circuitry, albeit on a reduced scale since there are fewer bands to search.

Accordingly, flowchart 600 shows that once a decision has been made, the methods disclosed herein make it possible to accelerate a frequency scan whether it is a full scan or an operator-based scan by performing the frequency scan in parallel at least for some combination of frequency bands based on the number of Rx paths of the RF FE circuitry.

Figure 7:
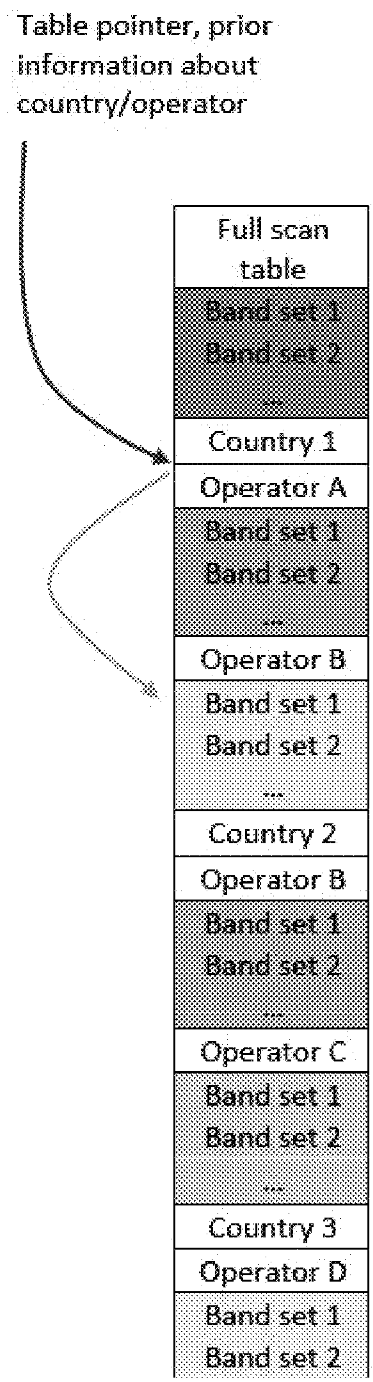
FIG. 7 exemplarily shows an organization of tables to use in a frequency scan according to the present disclosure.

The tables including the parallel frequency scan cell options of this disclosure may be indexed by country and then by operator. An example organization is shown in FIG. 7. In this example, the method described above in 600 may provide that the SIM of the terminal device contains information corresponding to Operator B of Country 1. Therefore, the table pointer is moved to the relevant table to retrieve the corresponding set of frequency bands for Operator B of Country 1 from the memory. The different sets of frequency bands are indicated by different shadings. If there was a requirement to execute a full search, then the table pointer would have pointed to the top of the table for the Full Scan table. It is important to note that for whichever operator-based table or full scan table is selected, the speed of execution of the frequency scan in the cell search is improved if such a table-based search technique is implemented. Additionally, as indicated earlier in this disclosure, it is possible to update the tables over the air through a firmware upgrade.

The algorithm shown in flowchart 600 covers all the frequency bands that need to be searched based on the situation. To accelerate the overall cell search process, the algorithm includes running a Rx IQ algorithm for the fast detection of candidate cells 612. This algorithm is based on the Rx IQ width and is discussed in further detail in the third part below.

The third part presents further details for a baseband technique to quickly reject false cells to further speed up the cell selection process. This part corresponds to box 612 in FIG. 6 and includes techniques for faster detection of low powered cell frequencies.

Figure 8:
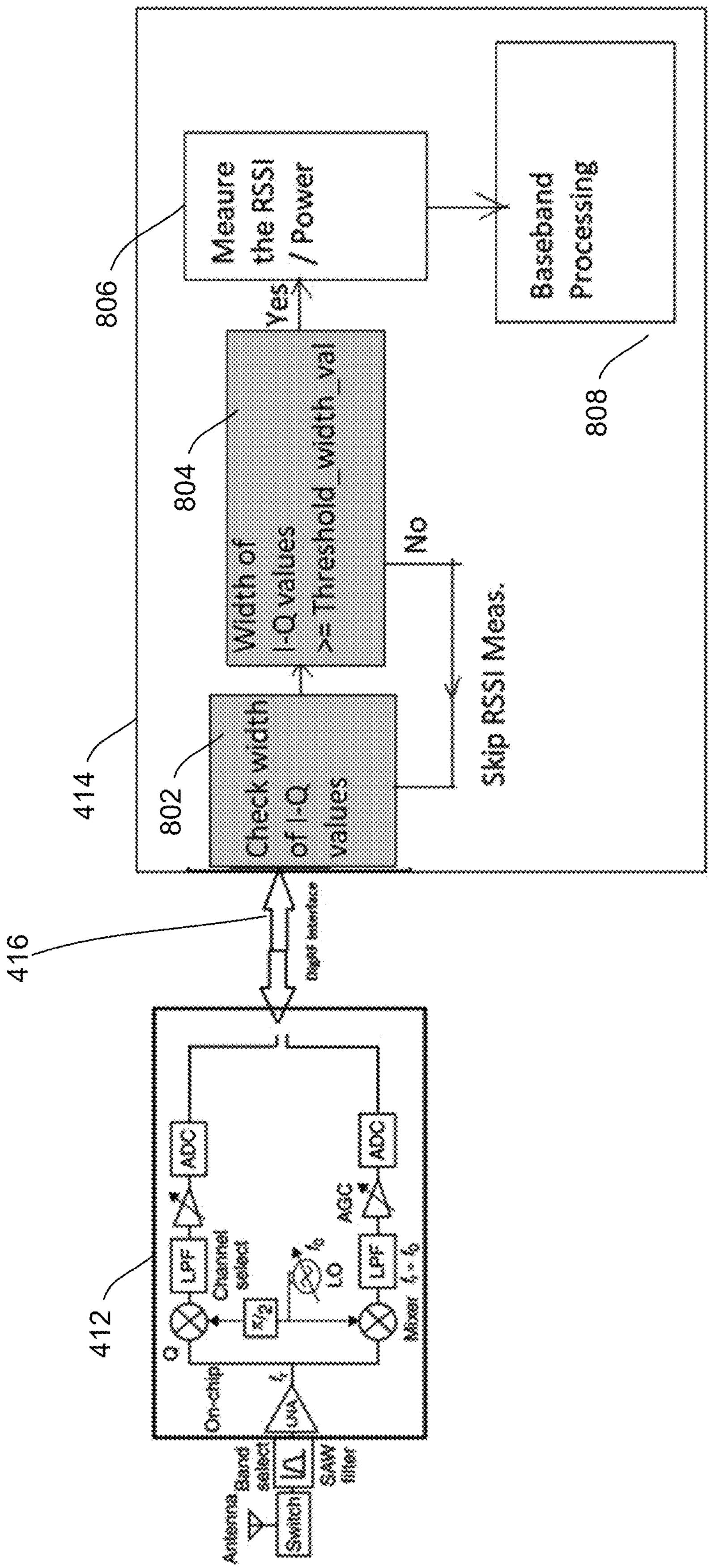
FIG. 8 exemplarily shows a diagram for a baseband technique to perform a fast detection of low powered cell frequencies according to the present disclosure.

FIG. 8 shows a block diagram 800 illustrating several components for implementing a baseband technique for fast detection of low powered cell frequencies according to the present disclosure. It is appreciated that block diagram 800 is exemplary in nature and may thus be simplified for purposes of this explanation.

During the cell search, after a configurable Rx path of the RF FE is tuned to a specific carrier frequency (i.e., the LO is set to a specific frequency for scanning), the received down converted signal is sampled and the RSSI is estimated using these samples. Generally, in the legacy method, this includes sending the samples from the RF receiver unit to the baseband processor. Later, if the signal power detected is too low (e.g., lower than a predetermined threshold), only then are the digitized samples corresponding to the received RF signal discarded. This consumes a valuable amount of processing time.

The present disclosure provides a technique to avoid the carrier signal's RSSI estimation if the signal power is too low by first checking the values of the IQ width 802 after receiving the down converted samples from the RF receiver. Generally, the maximum configured IQ width may be 13 bits or lower. When the signal is very poor, the width of the IQ samples may be too low, and it may hardly occupy a few least significant bits (LSBs) in the digital IQ signal. Here, the baseband processor 414 is configured to first check the width of the IQ values (i.e., samples) in 802 of the down-converted carrier frequency signal and compare the width of the IQ values to a threshold width value in 804. If the maximum width of the IQ signal is lower than the threshold width (e.g., most significant bit (MSB), MSB [n] onwards are all 0s), then this carrier frequency is discarded for further processing, i.e., the RSSI measurement for the carrier frequency is skipped.

In sum, by implementing the technique discussed above and shown in 802-804 of FIG. 8, the RSSI computation is skipped if the detected IQ width is below a certain threshold value, e.g., n number of MSBs are zeros in the max value of IQ, where $n \geq a$ threshold value. The value for n may be configurable and may be empirically derived and set. In this manner, the baseband is able to identify low power carrier frequencies earlier in the process and discard them for further processing to save computation resources, power, and time After determining which of the IQ samples satisfy the criteria of meeting the threshold in 804, these IQ samples may be passed along for RSSI power measurements in 806 and further baseband processing 808.

Figure 9:
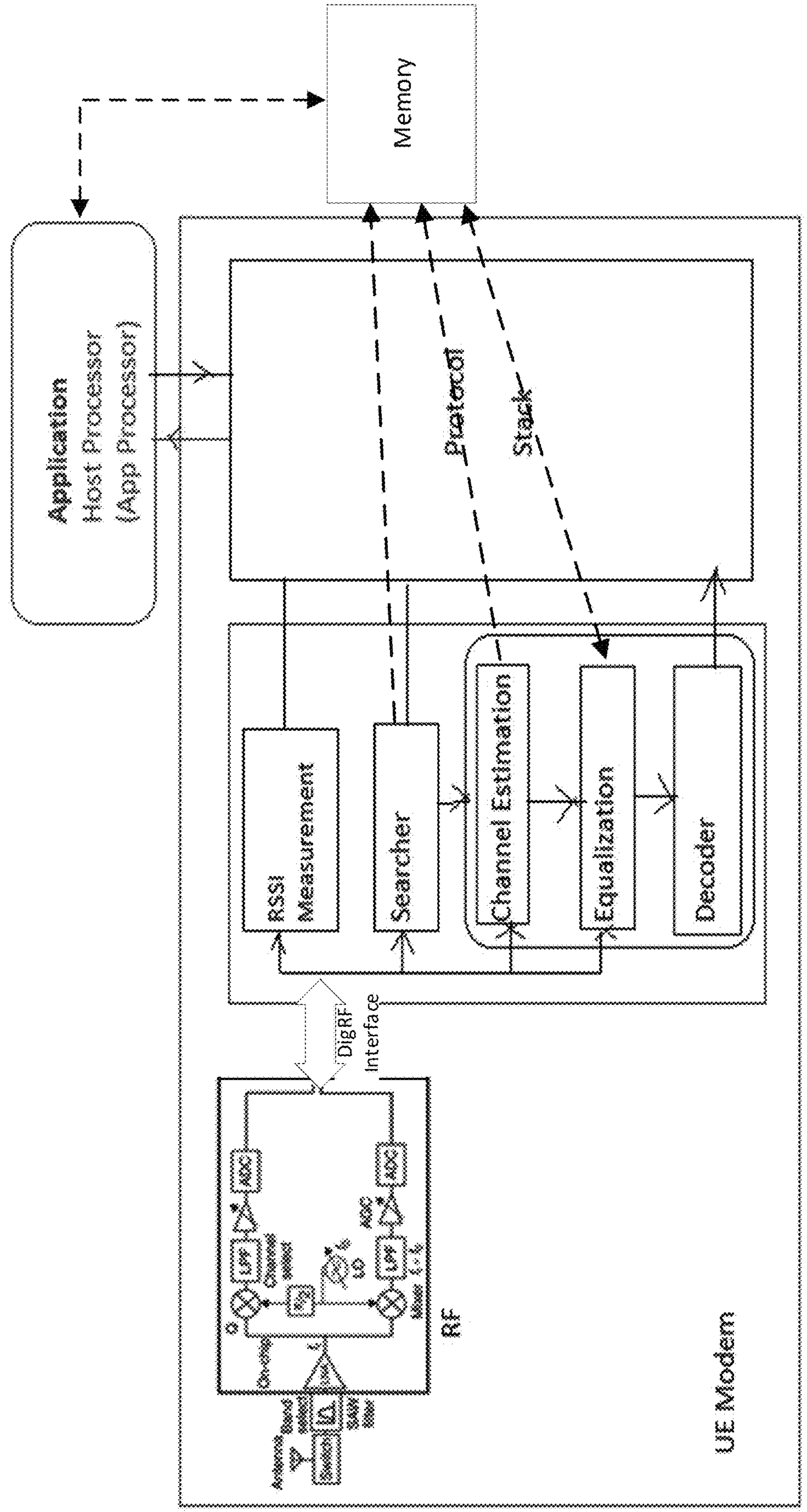
FIG. 9 exemplarily shows a baseband modem and application processor interface scheme for software implementation of the present disclosure.

FIG. 9 shows a diagram illustrating an offloading scheme from the baseband processor to the application processor for implementing the parallel search operations according to some aspects of the present disclosure.

For the baseband side, the parallel search operations may be implemented through a combination of hardware and/or software. For the implementation via hardware, there may be Searcher HW blocks available in the baseband modem for cell search operation already. The present disclosure leverages this existing hardware by utilizing these blocks more effectively in the parallel search operations as discussed herein. Looking forward to 5G and 6G (and beyond), since there will be more frequencies and/or cells to search, baseband processors may be fitted with additional Searcher HW blocks for parallel scanning.

For the implementation via software, the search operation may be run in the software (SW) in an available processor or digital signal processor (DSP). This solution may be implemented in scenarios where there are platforms with plenty of computing power available. Since the IQ samples are already in the digital domain, the baseband data may be passed along to a host processor (i.e., App processor) using a memory component as an interface. The host processor (i.e., App processor) in terminal devices such as laptops and tablets have a lot of computing power that may assist the baseband processor in signal processing. So, the IQ samples may be offloaded to the host processor and search operations may be implemented using software running on the host processor. The interfaces for such operations are exemplarily shown in FIG. 9. Such an architecture may also be useful in the future for 6G type UE architectures where artificial intelligence (AI) or machine learning (ML) based algorithms may be used for channel estimation or equalization algorithms to achieve an improved receiver bit error rate performance.

Figure 10:
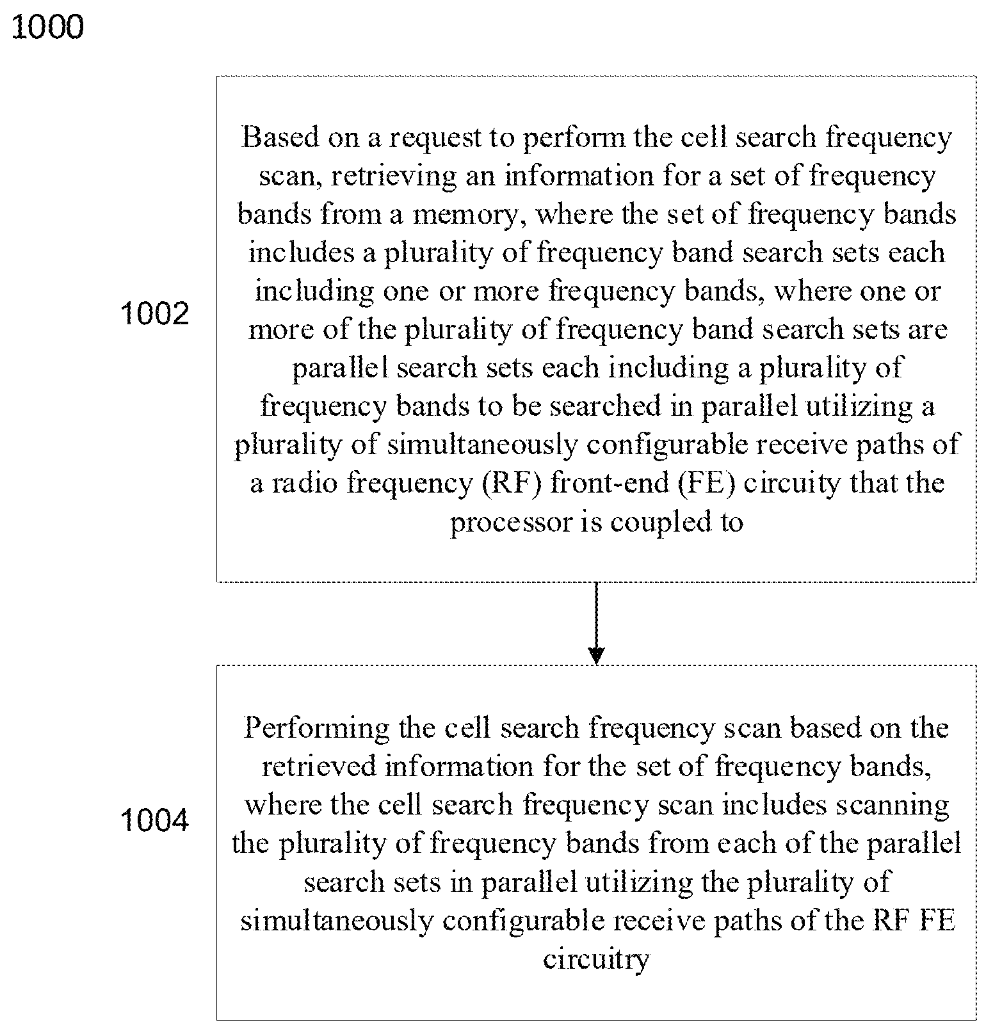
FIG. 10 exemplarily shows a flowchart according to the present disclosure.

FIG. 10 shows a flowchart 1000 for performing a frequency scan cell search according to some aspects. It is appreciated that flowchart 1000 is exemplary in nature and may be simplified for purposes of this explanation.

The method may include, based on a request to perform the cell search frequency scan, retrieving an information for a set of frequency bands from a memory, where the set of frequency bands includes a plurality of frequency band search sets each including one or more frequency bands, where one or more of the plurality of frequency band search sets are parallel search sets each including a plurality of frequency bands to be searched in parallel utilizing a plurality of simultaneously configurable receive paths of a radio frequency (RF) front-end (FE) circuitry that the processor is coupled to 1002. The method may also include performing the cell search frequency scan based on the retrieved information for the set of frequency bands, where the cell search frequency scan includes scanning the plurality of frequency bands from each of the parallel search sets in parallel utilizing the plurality of simultaneously configurable receive paths of the RF FE circuitry 1004.

Figure 11:
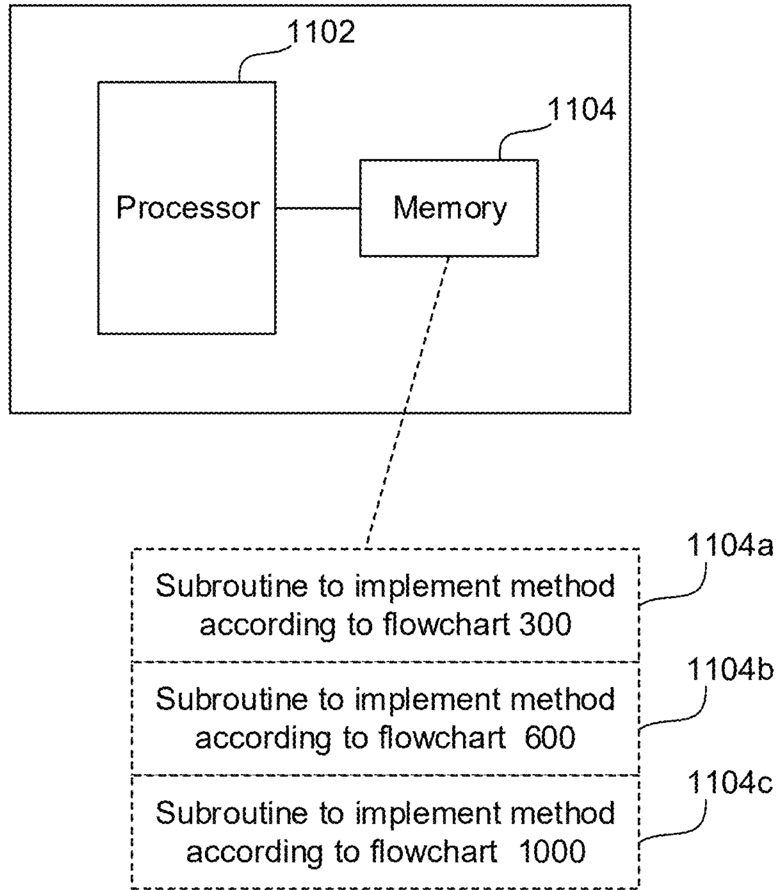
FIG. 11 exemplarily shows an internal diagram a device with a processor and a memory according to the present disclosure.

FIG. 11 shows an internal configuration of a device according to some aspects. As shown in FIG. 11, the device may include processor(s) 1102 and memory 1104. Processor(s) 1102 may be a single processor or multiple processors and may be configured to retrieve and execute program code to perform the methods as described herein. Processor(s) 1102 may transmit and receive data over a software-level connection.

Memory 1104 may be a non-transitory computer readable medium storing sub-routine instructions **1104*a*, 1104*b*, and/or 1104*c*. Memory 1104 may be a single memory or may be multiple memories and may be included as internal memories to processor(s) 1102 or may be external to processor(s) 1102. For example, the group of subroutines 1104*a*-1104*c* may provide instructions to the processor(s) to perform the methods of flowcharts 300, 600, and/or 1000**.

Figure 12:
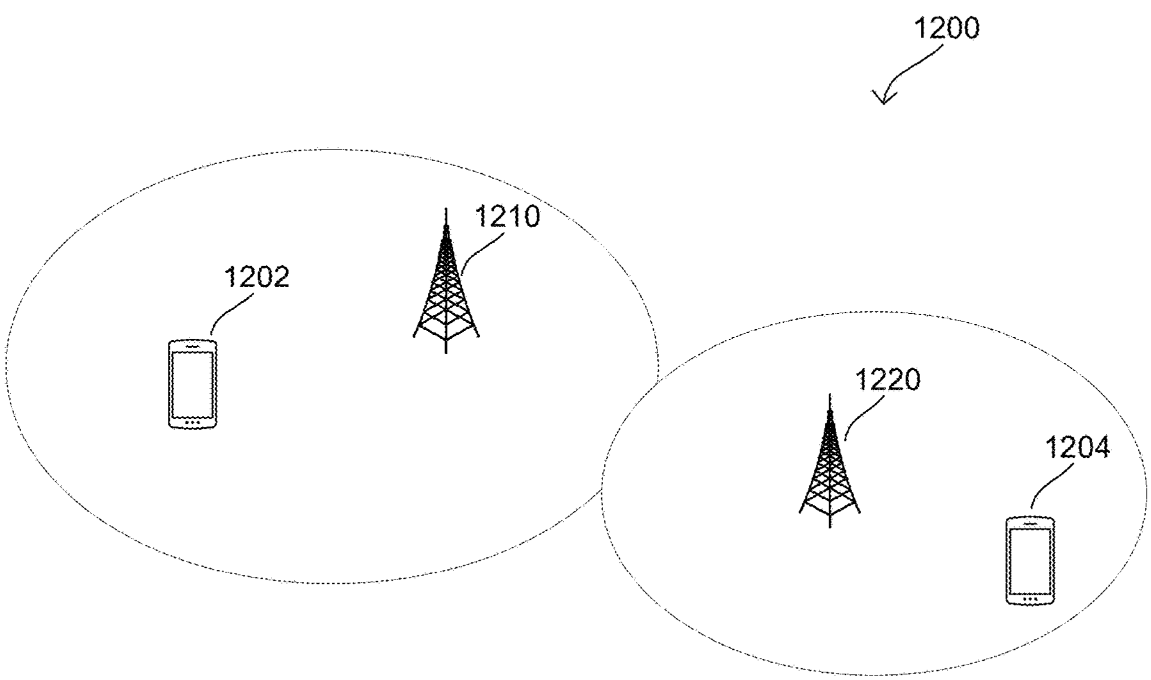
FIG. 12 exemplarily shows a network according to the present disclosure.
Figure 13:
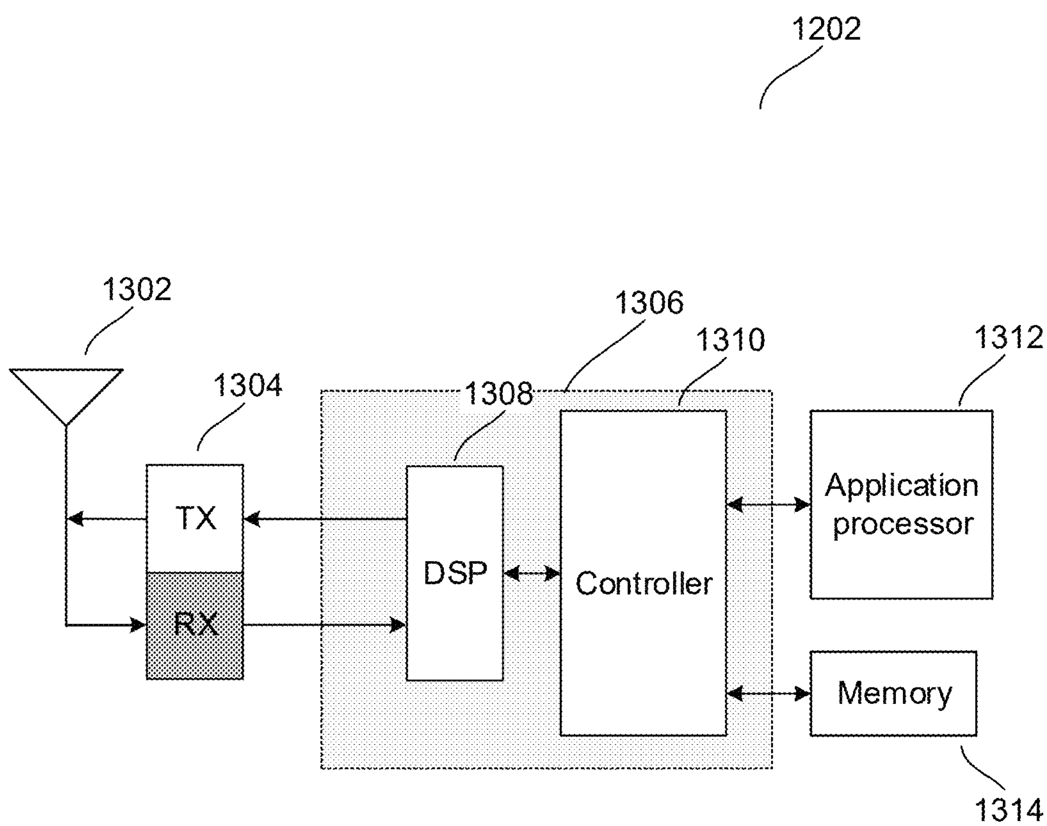
FIG. 13 exemplarily shows an internal configuration of terminal device according to the present disclosure.

FIGS. 12 and 13 depict an exemplary network and device architecture for wireless communications. In particular, FIG. 12 shows exemplary radio communication network 1200 according to some aspects, which may include terminal devices 1202 and 1204 and network access nodes 1210 and 1220. Radio communication network 1200 may communicate with terminal devices 1202 and 1204 via network access nodes 1210 and 1220 over a radio access network. Although certain examples described herein may refer to a particular radio access network context (e.g., 5G, LTE, UMTS, GSM, other 3rd Generation Partnership Project (3GPP) networks, WLAN/Wi-Fi, Bluetooth, etc.), these examples are demonstrative and may therefore be readily applied to any other type or configuration of radio access network. The number of network access nodes and terminal devices in radio communication network 1200 is exemplary and is scalable to any amount.

In an exemplary cellular context, network access nodes 1210 and 1220 may be base stations (e.g., gNodeBs, eNodeBs, or any other type of base station), while terminal devices 1202 and 1204 may be cellular terminal devices (e.g., Mobile Stations (MSs), User Equipments (UEs), or any type of cellular terminal device). Network access nodes 1210 and 1220 may therefore interface (e.g., via backhaul interfaces) with a cellular core network such as an Evolved Packet Core (EPC, for LTE) or other cellular core networks, which may also be considered part of radio communication network 1200. The cellular core network may interface with one or more external data networks. In an exemplary short-range context, network access node 1210 and 1220 may be access points (APs, e.g., WLAN or Wi-Fi APs), while terminal device 1202 and 1204 may be short range terminal devices (e.g., stations (STAs)). Network access nodes 1210 and 1220 may interface (e.g., via an internal or external router) with one or more external data networks.

Network access nodes 1210 and 1220 (and, optionally, other network access nodes of radio communication network 1200 not explicitly shown in FIG. 12) may accordingly provide a radio access network to terminal devices 1202 and 1204 (and, optionally, other terminal devices of radio communication network 1200 not explicitly shown in FIG. 12). In an exemplary cellular context, the radio access network provided by network access nodes 1210 and 1220 may enable terminal devices 1202 and 1204 to wirelessly access the core network via radio communications. The core network may provide switching, routing, and transmission, for traffic data related to terminal devices 1202 and 1204 and may further provide access to various internal data networks (e.g., control nodes, routing nodes that transfer information between other terminal devices on radio communication network 1200, etc.) and external data networks (e.g., data networks providing voice, text, multimedia (audio, video, image), and other Internet and application data). In an exemplary short-range context, the radio access network provided by network access nodes 1210 and 1220 may provide access to internal data networks (e.g., for transferring data between terminal devices connected to radio communication network 1200) and external data networks (e.g., data networks providing voice, text, multimedia (audio, video, image), and other Internet and application data).

The radio access network and core network (if applicable, such as for a cellular context) of radio communication network 1200 may be governed by communication protocols that can vary depending on the specifics of radio communication network 1200. Such communication protocols may define the scheduling, formatting, and routing of both user and control data traffic through radio communication network 1200, which includes the transmission and reception of such data through both the radio access and core network domains of radio communication network 1200. Accordingly, terminal devices 1202 and 1204 and network access nodes 1210 and 1220 may follow the defined communication protocols to transmit and receive data over the radio access network domain of radio communication network 1200, while the core network may follow the defined communication protocols to route data within and outside of the core network. Exemplary communication protocols include 5G/New Radio (NR), LTE, UMTS, GSM, WiMAX, Bluetooth, Wi-Fi, etc., any of which may be applicable to radio communication network 1200.

FIG. 13 shows an internal configuration of terminal device 1202 according to some aspects, which may include antenna system 1302, radio frequency (RF) transceiver 1304, baseband modem 1306 (including digital signal processor 1308 and protocol controller 1310), application processor 1312, and memory 1314. Although not explicitly shown in FIG. 13, in some aspects terminal device 1202 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 1202 may transmit and receive radio signals on one or more radio access networks. Baseband modem 1306 may direct such communication functionality of terminal device 1202 according to the communication protocols associated with each radio access network and may execute control over antenna system 1302 and RF transceiver 1304 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 1202 shown in FIG. 13 depicts only a single instance of such components.

Terminal device 1202 may transmit and receive wireless signals with antenna system 1302, which may be a single antenna or an antenna array that includes multiple antennas. In the receive (RX) path, RF transceiver 1304 may receive analog radio frequency signals from antenna system 1302 and perform analog and digital RF front-end processing on the analog radio frequency signals to produce digital baseband samples (e.g., In-Phase/Quadrature (IQ) samples) to provide to baseband modem 1306. RF transceiver 1304 may include analog and digital reception components including amplifiers (e.g., Low Noise Amplifiers (LNAs)), filters, RF demodulators (e.g., RF IQ demodulators)), and analog-to-digital converters (ADCs), which RF transceiver 1304 may utilize to convert the received radio frequency signals to digital baseband samples. In the transmit (TX) path, RF transceiver 1304 may receive digital baseband samples from baseband modem 1306 and perform analog and digital RF front-end processing on the digital baseband samples to produce analog radio frequency signals to provide to antenna system 1302 for wireless transmission. RF transceiver 1304 may thus include analog and digital transmission components including amplifiers (e.g., Power Amplifiers (PAS), filters, RF modulators (e.g., RF IQ modulators), and digital-to-analog converters (DACs), which RF transceiver 1304 may utilize to mix the digital baseband samples received from baseband modem 1306 and produce the analog radio frequency signals for wireless transmission by antenna system 1302. In some aspects baseband modem 1306 may control the radio transmission and reception of RF transceiver 1304, including specifying the transmit and receive radio frequencies for operation of RF transceiver 1304.

As shown in FIG. 13, baseband modem 1306 may include digital signal processor 1308, which may perform physical layer (PHY, Layer 1) transmission and reception processing to, in the transmit path, prepare outgoing transmit data provided by protocol controller 1310 for transmission via RF transceiver 1304, and, in the receive path, prepare incoming received data provided by RF transceiver 1304 for processing by protocol controller 1310. Digital signal processor 1308 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 1308 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 1308 may include one or more processors configured to retrieve and execute program code that defines control and processing logic for physical layer processing operations. In some aspects, digital signal processor 1308 may execute processing functions with software via the execution of executable instructions. In some aspects, digital signal processor 1308 may include one or more dedicated hardware circuits (e.g., ASICs, FPGAS, and other hardware) that are digitally configured to specific execute processing functions, where the one or more processors of digital signal processor 1308 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 1308 may be realized as a coupled integrated circuit.

Terminal device 1202 may be configured to operate according to one or more radio communication technologies. Digital signal processor 1308 may be responsible for lower-layer processing functions (e.g., Layer 1/PHY) of the radio communication technologies, while protocol controller 1310 may be responsible for upper-layer protocol stack functions (e.g., Data Link Layer/Layer 2 and/or Network Layer/Layer 3). Protocol controller 1310 may thus be responsible for controlling the radio communication components of terminal device 1202 (antenna system 1302, RF transceiver 1304, and digital signal processor 1308) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 1310 may be structurally embodied as a processor configured to execute protocol stack software (retrieved from a controller memory) and subsequently control the radio communication components of terminal device 1202 to transmit and receive communication signals in accordance with the corresponding protocol stack control logic defined in the protocol stack software. Protocol controller 1310 may include one or more processors configured to retrieve and execute program code that defines the upper-layer protocol stack logic for one or more radio communication technologies, which can include Data Link Layer/

Layer 2 and Network Layer/Layer 3 functions. Protocol controller 1310 may be configured to perform both user-plane and control-plane functions to facilitate the transfer of application layer data to and from radio terminal device 1202 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 1310 may include executable instructions that define the logic of such functions.

In some aspects, terminal device 1202 may be configured to transmit and receive data according to multiple radio communication technologies. Accordingly, in some aspects one or more of antenna system 1302, RF transceiver 1304, digital signal processor 1308, and protocol controller 1310 may include separate components or instances dedicated to different radio communication technologies and/or unified components that are shared between different radio communication technologies. For example, in some aspects protocol controller 1310 may be configured to execute multiple protocol stacks, each dedicated to a different radio communication technology and either at the same processor or different processors. In some aspects, digital signal processor 1308 may include separate processors and/or hardware accelerators that are dedicated to different respective radio communication technologies, and/or one or more processors and/or hardware accelerators that are shared between multiple radio communication technologies. In some aspects, RF transceiver 1304 may include separate RF circuitry sections dedicated to different respective radio communication technologies, and/or RF circuitry sections shared between multiple radio communication technologies. In some aspects, antenna system 1302 may include separate antennas dedicated to different respective radio communication technologies, and/or antennas shared between multiple radio communication technologies. Accordingly, while antenna system 1302, RF transceiver 1304, digital signal processor 1308, and protocol controller 1310 are shown as individual components in FIG. 13, in some aspects antenna system 1302, RF transceiver 1304, digital signal processor 1308, and/or protocol controller 1310 can encompass separate components dedicated to different radio communication technologies.

Figure 14:
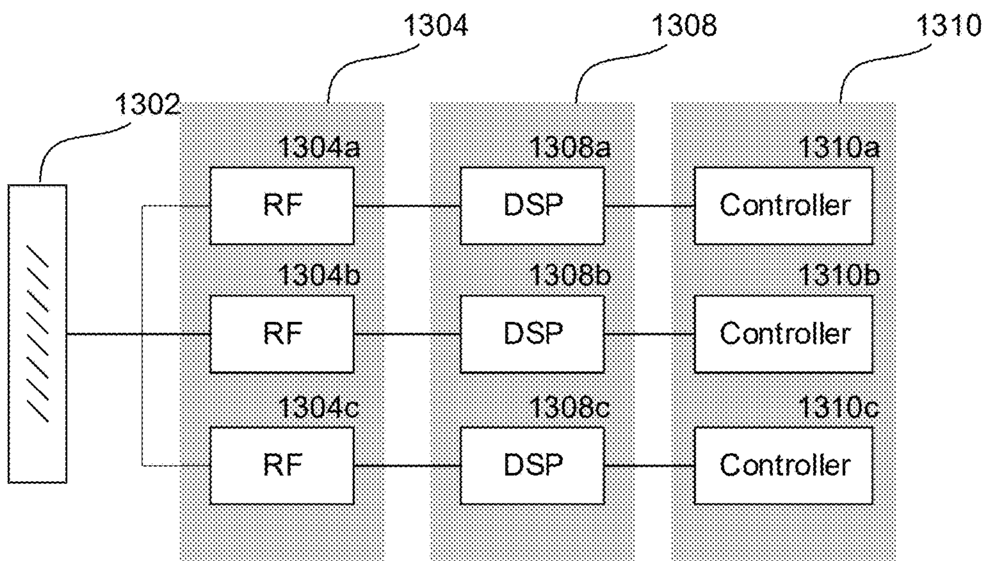
FIG. 14 shows an exemplary configuration of signal acquisition and processing circuitry according to some aspects.

FIG. 14 shows an example in which RF transceiver 1304 includes RF transceiver 1304*a* for a first radio communication technology, RF transceiver 1304*b* for a second radio communication technology, and RF transceiver 1304*c* for a third radio communication technology. Likewise, digital signal processor 1308 includes digital signal processor 1308*a* for the first radio communication technology, digital signal processor 1308*b* for the second radio communication technology, and digital signal processor 1308*c* for the third radio communication technology. Similarly, controller 1310 may include controller 1310*a* for the first radio communication technology, controller 1310*b* for the second radio communication technology, and controller 1310*c* for the third radio communication technology. RF transceiver 1304*a*, digital signal processor 1308*a*, and controller 1310*a* thus form a communication arrangement (e.g., the hardware and software components dedicated to a particular radio communication technology) for the first radio communication technology, RF transceiver 1304*b*, digital signal processor 1308*b*, and controller 1310*b* thus form a communication arrangement for the second radio communication technology, and RF transceiver 1304*c*, digital signal processor 1308*c*, and controller 1310*c* thus form a communication arrangement for the third radio communication technology. While depicted as being logically separate in FIG. 14, any components of the communication arrangements may be integrated into a common component.

Terminal device 1202 may also include application processor 1312 and memory 1314. Application processor 1312 may be a CPU and may be configured to handle the layers above the protocol stack, including the transport and application layers. Application processor 1312 may be configured to execute various applications and/or programs of terminal device 1202 at an application layer of terminal device 1202, such as an operating system (OS), a user interface (UI) for supporting user interaction with terminal device 1202, and/or various user applications. The application processor may interface with baseband modem 1306 and act as a source (in the transmit path) and a sink (in the receive path) for user data, such as voice data, audio/video/image data, messaging data, application data, basic Internet/web access data, etc. In the transmit path, protocol controller 1310 may therefore receive and process outgoing data provided by application processor 1312 according to the layer-specific functions of the protocol stack and provide the resulting data to digital signal processor 1308. Digital signal processor 1308 may then perform physical layer processing on the received data to produce digital baseband samples, which digital signal processor may provide to RF transceiver 1304. RF transceiver 1304 may then process the digital baseband samples to convert the digital baseband samples to analog RF signals, which RF transceiver 1304 may wirelessly transmit via antenna system 1302. In the receive path, RF transceiver 1304 may receive analog RF signals from antenna system 1302 and process the analog RF signals to obtain digital baseband samples. RF transceiver 1304 may provide the digital baseband samples to digital signal processor 1308, which may perform physical layer processing on the digital baseband samples. Digital signal processor 1308 may then provide the resulting data to protocol controller 1310, which may process the resulting data according to the layer-specific functions of the protocol stack and provide the resulting incoming data to application processor 1312. Application processor 1312 may then handle the incoming data at the application layer, which can include execution of one or more application programs with the data and/or presentation of the data to a user via a user interface.

Memory 1314 may embody a memory component of terminal device 1202, such as a hard drive or another such permanent memory device. Although not explicitly depicted in FIG. 13, the various other components of terminal device 1202 shown in FIG. 13 may additionally each include integrated permanent and non-permanent memory components, such as for storing software program code, buffering data, etc.

In accordance with some radio communication networks, terminal devices 1202 and 1204 may execute mobility procedures to connect to, disconnect from, and switch between available network access nodes of the radio access network of radio communication network 1200. As each network access node of radio communication network 1200 may have a specific coverage area, terminal devices 1202 and 1204 may be configured to select and re-select between the available network access nodes in order to maintain a strong radio access connection with the radio access network of radio communication network 1200. For example, terminal device 1202 may establish a radio access connection with network access node 1210 while terminal device 1204 may establish a radio access connection with network access node 1220. In the event that the current radio access connection degrades, terminal devices 1202 or 1204 may seek a new radio access connection with another network access node of radio communication network 1200; for example, terminal device 1204 may move from the coverage area of network access node 1220 into the coverage area of network access node 1210. As a result, the radio access connection with network access node 1220 may degrade, which terminal device 1204 may detect via radio measurements such as signal strength or signal quality measurements of network access node 1220. Depending on the mobility procedures defined in the appropriate network protocols for radio communication network 1200, terminal device 1204 may seek a new radio access connection (which may be, for example, triggered at terminal device 1204 or by the radio access network), such as by performing radio measurements on neighboring network access nodes to determine whether any neighboring network access nodes can provide a suitable radio access connection. As terminal device 1204 may have moved into the coverage area of network access node 1210, terminal device 1204 may identify network access node 1210 (which may be selected by terminal device 1204 or selected by the radio access network) and transfer to a new radio access connection with network access node 1210. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

The word “exemplary” is used herein to mean “serving as an example, instance, or illustration”. Any aspect or design described herein as “exemplary” is not necessarily to be construed as preferred or advantageous over other aspects or designs.

The words “plurality” and “multiple” in the description or the claims expressly refer to a quantity greater than one. The terms “group (of)”, “set [of]”, “collection (of)”, “series (of)”, “sequence (of)”, “grouping (of)”, etc., and the like in the description or in the claims refer to a quantity equal to or greater than one, i.e., one or more. Any term expressed in plural form that does not expressly state “plurality” or “multiple” likewise refers to a quantity equal to or greater than one. The terms “proper subset”, “reduced subset”, and “lesser subset” refer to a subset of a set that is not equal to the set, i.e., a subset of a set that contains less elements than the set.

The terms “processor” or “controller” as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a “processing circuit,” “processing circuitry,” among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which is described in further detail within this disclosure, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, “memory” is understood as a non-transitory computer-readable medium in which data or information can be stored for retrieval. References to “memory” included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as “memory” or “a memory” may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term “software” refers to any type of executable instruction, including firmware.

The term “cellular modem” utilized herein refers to components used in the reception and transmission of RF signals in cellular communications. These components may generally include RF FE circuitry, RF transceiver components, and/or a baseband modem including a digital signal processor and/or a protocol controller.

The term “terminal device” utilized herein refers to user-side devices (both portable and fixed) that can connect to a core network and/or external data networks via a radio access network. “Terminal device” can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications.

The term “network access node” as utilized herein refers to a network-side device that provides a radio access network with which terminal devices can connect and exchange information with a core network and/or external data networks through the network access node. “Network access nodes” can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a “cell” in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term “cell” may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may be generally referred to herein as “cellular” communication technologies.

The terms “radio communication network” and “wireless network” as utilized herein encompasses both an access section of a network (e.g., a radio access network (RAN) section) and a core section of a network (e.g., a core network section). The term “radio idle mode” or “radio idle state” used herein in reference to a terminal device refers to a radio control state in which the terminal device is not allocated at least one dedicated communication channel of a mobile communication network. The term “radio connected mode” or “radio connected state” used in reference to a terminal device refers to a radio control state in which the terminal device is allocated at least one dedicated uplink communication channel of a radio communication network.

Unless explicitly specified, the term “transmit” encompasses both direct (point-to-point) and indirect transmission (via one or more intermediary points). Similarly, the term “receive” encompasses both direct and indirect reception. Furthermore, the terms “transmit”, “receive”, “communicate”, and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term “communicate” encompasses one or both of transmitting and receiving, i.e., unidirectional or bidirectional communication in one or both of the incoming and outgoing directions. The term “calculate” encompasses both ‘direct’ calculations via a mathematical expression/formula/relationship and ‘indirect’ calculations via lookup or hash tables and other array indexing or searching operations.

The following examples pertain to further aspects of this disclosure:

Example 1 is a device including a processor configured to: based on a request to perform a cell search frequency scan, retrieve an information for a set of frequency bands from a memory, where the set of frequency bands includes a plurality of frequency band search sets each including one or more frequency bands, where one or more of the plurality of frequency band search sets are parallel search sets each including a plurality of frequency bands to be searched in parallel utilizing a plurality of simultaneously configurable receive paths of a radio frequency (RF) front-end (FE) circuitry that the processor is coupled to; and perform the cell search frequency scan based on the retrieved information for the set of frequency bands, where the cell search frequency scan includes scanning the plurality of frequency bands from each of the parallel search sets in parallel utilizing the plurality of simultaneously configurable receive paths of the RF FE circuitry. In some aspects, the plurality of frequency bands in each of the parallel search sets may also be based on having similar sized bandwidths, e.g., having a bandwidth within a predetermined range as one another.

In Example 2, the subject matter of Example(s) 1 may include where each of the plurality of simultaneously configurable receive paths of the RF FE circuitry includes a multiplexer, a low noise amplifier (LNA), a local oscillator (LO), two down-conversion mixers, one or more filters, and an analog-to-digital converter (ADC).

In Example 3, the subject matter of Example(s) 2 may include where the LO in each of the plurality of simultaneously configurable receive paths is configured to generate a signal with a different frequency than the other LOs in the plurality of simultaneously configurable receive paths.

In Example 4, the subject matter of Example(s) 1-3 may include where the request to perform the cell search frequency scan is triggered in response to powering on the device, a cell reselection procedure, a cell handover procedure, or a neighbor cell measurement procedure.

In Example 5, the subject matter of Example(s) 1-4 may include where the set of frequency bands corresponds to frequency bands to be searched in a full scan for the cell search frequency scan, where the full scan is triggered based on having no a priori knowledge for the frequency bands of a network the device is performing the cell search frequency scan for.

In Example 6, the subject matter of Example(s) 1-5 may include where the set of frequency bands corresponds to frequency bands of a known network operator for a network the device is performing the cell search frequency scan for.

In Example 7, the subject matter of Example(s) 1-6 may include where the processor is configured to select between performing a full scan or a network operator scan for the cell search frequency scan to determine which information for the set of frequency bands to retrieve from the memory, where the processor is configured to select to perform the network operator scan if the cell search frequency scan is to be performed for a network that the device has information for.

In Example 8, the subject matter of Example(s) 1-7 may include where the cell search frequency scan includes performing signal strength measurements for each of the frequency bands in each of the plurality of frequency band search sets.

In Example 9, the subject matter of Example(s) 8 may include where performing the signal strength measurements includes measuring a received signal strength indicator (RSSI) corresponding to radio signals for each of the frequency bands in each of the plurality of frequency band search sets.

In Example 10, the subject matter of Example(s) 1-9 may include where the cell search frequency scan includes obtaining quadrature (IQ) values for down-converted signals obtained for each of the one or more frequencies bands in the plurality of frequency band search sets and determining widths of the IQ values, where the widths of the IQ values correspond to a number of bits.

In Example 11, the subject matter of Example(s) 10 may include where the processor is configured to compare the widths of the IQ values for down-converted signals obtained for each of the one or more frequencies bands in the plurality of frequency band search sets with a threshold and discard frequency bands whose IQ values fall below the threshold for further processing, where the further processing includes measuring the received signal strength indicator (RSSI) corresponding to radio signals for each of the frequency bands in each of the plurality of frequency band search sets.

In Example 12, the subject matter of Example(s) 1-11 may include the processor further configured to select frequency bands from the cell search frequency band scan for further processing based on the selected frequency bands satisfying a cell selection criteria.

In Example 13, the subject matter of Example(s) 12 may include the processor further configured to perform synchronization signal detection followed by System Information Block (SIB) reading for the selected frequency bands in parallel using the plurality of simultaneously configurable receive paths of the RF FE circuitry.

Example 14 is a device including a processor configured to receive digital IQ samples associated with a down-converted signal from a radio frequency (RF) receiver component; determine a width of the digital IQ samples associated with the down-converted signal, where the width corresponds to a number of bits; compare the width of the digital IQ samples to a threshold; and discard a carrier frequency associated with the down-converted signal for further processing based on the width of the IQ values falling below the threshold.

In Example 15, the subject matter of Example(s) 14 may include where the threshold is based on a number of most significant bits (MSBs) of the digital IQ samples that are zeroes.

In Example 16, the subject matter of Example(s) 14 may include the processor further configured to perform a signal strength measurement corresponding to the down/converted signal based on the digital IQ samples meeting the threshold.

In Example 17, the subject matter of Example(s) 14 may include where the signal strength measurement includes a received signal strength indication (RSSI) measurement.

Example 18 is a method to generate one or more tables for a terminal device to use in a frequency scan for cell search operations, the method including, for each respective table: determining a number indicating a plurality of simultaneously configurable receive paths of a radio frequency (RF) front-end (FE) circuitry of the terminal device; determining a plurality of frequency bands to be searched in the frequency scan based on one or more criteria; based on the number indicating the plurality of simultaneously configurable receive paths of the RF FE circuitry and the plurality of frequency bands to be searched in the frequency scan, divide the plurality of frequency bands into a plurality of frequency band search sets, where one or more of the plurality of frequency band search sets are parallel search sets including two or more frequency bands capable of being searched in parallel utilizing the plurality of simultaneously configurable receive paths of the RF FE circuitry.

In Example 19, the subject matter of Example(s) 18 may include where the one or more criteria includes frequency bands supported by the terminal device and/or frequency bands supported by a network operator for a geographic area.

In Example 20, the subject matter of Example(s) 18-19 may include where the number indicating the plurality of simultaneously configurable receive paths of the RF FE circuitry is based on a number of local oscillator (LO) in the RF FE circuitry.

Example 21 is a method to perform a cell search frequency scan, the method including: based on a request to perform the cell search frequency scan, retrieving an information for a set of frequency bands from a memory, where the set of frequency bands includes a plurality of frequency band search sets each including one or more frequency bands, where one or more of the plurality of frequency band search sets are parallel search sets each including a plurality of frequency bands to be searched in parallel utilizing a plurality of simultaneously configurable receive paths of a radio frequency (RF) front-end (FE) circuitry; and performing the cell search frequency scan based on the retrieved information for the set of frequency bands, where the cell search frequency scan includes scanning the plurality of frequency bands from each of the parallel search sets in parallel utilizing the plurality of simultaneously configurable receive paths of the RF FE circuitry. In some aspects, the plurality of frequency bands in each of the parallel search sets may also be based on having similar sized bandwidths, e.g., having a bandwidth within a predetermined range as one another.

In Example 22, the subject matter of Example(s) 21 may include where each of the plurality of simultaneously configurable receive paths of the RF FE circuitry includes a multiplexer, a low noise amplifier (LNA), a local oscillator (LO), two down-conversion mixers, one or more filters, and an analog-to-digital converter (ADC).

In Example 23, the subject matter of Example(s) 22 may include where the LO in each of the plurality of simultaneously configurable receive paths is configured to generate a signal with a different frequency than the other LOs in the plurality of simultaneously configurable receive paths.

In Example 24, the subject matter of Example(s) 21-23 may include triggering the request to perform the cell search frequency scan in response to powering on the device, a cell reselection procedure, a cell handover procedure, or a neighbor cell measurement procedure.

In Example 25, the subject matter of Example(s) 21-24 may include where the set of frequency bands corresponds to frequency bands to be searched in a full scan for the cell search frequency scan, where the full scan is triggered based on having no a priori knowledge for the frequency bands of a network the device is performing the cell search frequency scan for.

In Example 26, the subject matter of Example(s) 21-25 may include where the set of frequency bands corresponds to frequency bands of a known network operator for a network the device is performing the cell search frequency scan for.

In Example 27, the subject matter of Example(s) 21-26 may include selecting between performing a full scan or a network operator scan for the cell search frequency scan to determine which information for the set of frequency bands to retrieve from the memory, where the processor is configured to select to perform the network operator scan if the cell search frequency scan is to be performed for a network that the device has information for.

In Example 28, the subject matter of Example(s) 21-27 may include where the cell search frequency scan includes performing signal strength measurements for each of the frequency bands in each of the plurality of frequency band search sets.

In Example 29, the subject matter of Example(s) 28 may include where performing the signal strength measurements includes measuring a received signal strength indicator (RSSI) corresponding to radio signals for each of the frequency bands in each of the plurality of frequency band search sets.

In Example 30, the subject matter of Example(s) 21-29 may include where the cell search frequency scan includes obtaining quadrature (IQ) values for down-converted signals obtained for each of the one or more frequencies bands in the plurality of frequency band search sets and determining widths of the IQ values, where the widths of the IQ values correspond to a number of bits.

In Example 31, the subject matter of Example(s) 30 may include comparing the widths of the IQ values for down-converted signals obtained for each of the one or more frequencies bands in the plurality of frequency band search sets with a threshold and discard frequency bands whose IQ values fall below the threshold for further processing, where the further processing includes measuring the received signal strength indicator (RSSI) corresponding to radio signals for each of the frequency bands in each of the plurality of frequency band search sets.

In Example 32, the subject matter of Example(s) 21-31 may include selecting frequency bands from the cell search frequency band scan for further processing based on the selected frequency bands satisfying a cell selection criteria.

In Example 33, the subject matter of Example(s) 32 may include performing synchronization signal detection followed by System Information Block (SIB) reading for the selected frequency bands in parallel using the plurality of simultaneously configurable receive paths of the RF FE circuitry.

Example 34 is a method including receiving digital IQ samples associated with a down-converted signal from a radio frequency (RF) receiver component; determining a width of the digital IQ samples associated with the down-converted signal, where the width corresponds to a number of bits; comparing the width of the digital IQ samples to a threshold; and discarding a carrier frequency associated with the down-converted signal for further processing based on the width of the IQ values falling below the threshold.

In Example 35, the subject matter of Example(s) 34 may include where the threshold is based on a number of most significant bits (MSBs) of the digital IQ samples that are zeroes.

In Example 36, the subject matter of Example(s) 34-35 may include performing a signal strength measurement corresponding to the down/converted signal based on the digital IQ samples meeting the threshold.

In Example 37, the subject matter of Example(s) 36 may include where the signal strength measurement includes a received signal strength indication (RSSI) measurement.

Example 38 is a device including means to, based on a request to perform a cell search frequency scan, retrieve an information for a set of frequency bands from a memory, where the set of frequency bands includes a plurality of frequency band search sets each including one or more frequency bands, where one or more of the plurality of frequency band search sets are parallel search sets each including a plurality of frequency bands to be searched in parallel utilizing a plurality of simultaneously configurable receive paths of a radio frequency (RF) front-end (FE) circuitry that the processor is coupled to; and means to perform the cell search frequency scan based on the retrieved information for the set of frequency bands, where the cell search frequency scan includes scanning the plurality of frequency bands from each of the parallel search sets in parallel utilizing the plurality of simultaneously configurable receive paths of the RF FE circuitry. In some aspects, the plurality of frequency bands in each of the parallel search sets may also be based on having similar sized bandwidths, e.g., having a bandwidth within a predetermined range as one another.

Example 39 is a device including means to receive digital IQ samples associated with a down-converted signal from a radio frequency (RF) receiver component; means to determine a width of the digital IQ samples associated with the down-converted signal, where the width corresponds to a number of bits; means to compare the width of the digital IQ samples to a threshold; and means to discard a carrier frequency associated with the down-converted signal for further processing based on the width of the IQ values falling below the threshold.

Example 40 is one or more non-transitory readable media storing instructions thereon that, when executed by a processor of a device, cause the processor to perform the method or realize a device of Examples 1-39.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

The invention claimed is:

1. A device comprising a processor configured to:

based on a request to perform a cell search frequency scan, retrieve from a memory an information for a set of frequency bands, wherein the set of frequency bands comprises a plurality of frequency band search sets each comprising one or more frequency bands, wherein one or more of the plurality of frequency band search sets are parallel search sets each comprising a plurality of frequency bands to be searched in parallel utilizing a plurality of simultaneously configurable receive paths of a radio frequency (RF) front-end (FE) circuitry, wherein the processor is coupled to the RF FE circuitry;

perform the cell search frequency scan based on the retrieved information for the set of frequency bands, wherein the cell search frequency scan comprises the processor configured to:

scan the plurality of frequency bands from each of the parallel search sets in parallel utilizing the plurality of simultaneously configurable receive paths of the RF FE circuitry;

determine, for each of the one or more frequency bands in the plurality of frequency band search sets, a corresponding bit-width of in-phase/quadrature (IQ) values for down-converted signals; and discard the one or more frequency bands from a measurement of its received signal strength indicator (RSSI) value if the corresponding bit-width for the one or more frequency bands is below a predefined threshold bit-width.

2. The device of claim 1, wherein each of the plurality of simultaneously configurable receive paths of the RF FE circuitry comprises a multiplexer, a low noise amplifier (LNA), a local oscillator (LO), two down-conversion mixers, one or more filters, and an analog-to-digital converter (ADC).

3. The device of claim 2, wherein the LO in each of the plurality of simultaneously configurable receive paths is configured to generate a signal with a different frequency than the other LOs in the plurality of simultaneously configurable receive paths.

4. The device of claim 1, wherein the request to perform the cell search frequency scan is triggered in response to powering on the device, a cell reselection procedure, a cell handover procedure, or a neighbor cell measurement procedure.

5. The device of claim 1, wherein the set of frequency bands corresponds to frequency bands of a known network operator for a network in which the processor of the device is configured to perform the cell search frequency scan.

6. The device of claim 1, wherein the processor is configured to select, cell search frequency scan, between a full scan or a network operator scan for the cell search frequency scan to determine which information for the set of frequency bands to retrieve from the memory, wherein the processor is configured to select to perform the network operator scan if the cell search frequency scan is to be performed for a network for which the device has information.

7. The device of claim 1, wherein the processor is further configured to select frequency bands from the cell search frequency band scan for further processing based on the selected frequency bands satisfying a cell selection criteria.

8. The device of claim 7, wherein the processor is further configured to perform synchronization signal detection followed by System Information Block (SIB) reading for the selected frequency bands in parallel using the plurality of simultaneously configurable receive paths of the RF FE circuitry.

9. A non-transitory computer readable medium comprising instructions, which, when executed, cause one or more processors to:

receive digital in-phase/quadrature (IQ) samples associated with a down-converted signal from a radio frequency (RF) receiver component, wherein the down-converted signal is associated with a carrier frequency;

determine a bit-width of the digital IQ samples associated with the down-converted signal;

compare the bit-width of the digital IQ samples to a threshold bit-width; and discard, if the bit-width of the digital IQ samples are below the threshold bit-width, from a measurement of a received signal strength (RSSI) value for the carrier frequency.

10. The non-transitory computer readable medium of claim 9, wherein the bit-width is a number of most significant bits (MSBs) of the digital IQ samples that are zero, wherein the threshold bit-width is a minimum number of MSBs that are zero.

11. An apparatus for performing a cell search frequency scan, the apparatus comprising:

a means for retrieving, based on a request to perform the cell search frequency scan, an information for a set of frequency bands from a memory, wherein the set of frequency bands comprises a plurality of frequency band search sets each comprising one or more frequency bands, wherein one or more of the plurality of frequency band search sets are parallel search sets comprising a plurality of frequency bands to be searched in parallel utilizing a plurality of simultaneously configurable receive paths of a radio frequency (RF) front-end (FE) circuitry; and a means for performing the cell search frequency scan based on the retrieved information for the set of frequency bands, wherein the cell search frequency scan comprises:

scanning the plurality of frequency bands from each of the parallel search sets in parallel utilizing the plurality of simultaneously configurable receive paths of the RF FE circuitry;

determining, for each of the one or more frequency bands in the plurality of frequency band search sets, a corresponding bit-width of in-phase/quadrature (IQ) values for down-converted signals; and discarding the one or more frequency bands from a measurement of its received signal strength indicator (RSSI) value if the corresponding bit-width for the one or more frequency bands is below a predefined threshold bit-width.

12. The apparatus of claim 11, the apparatus further comprising a means for selecting, as the cell search frequency scan, between a full scan or a network operator scan to determine which information for the set of frequency bands to retrieve from the memory, wherein the means for selecting is configured to select the network operator scan as the cell search frequency scan if the cell search frequency scan is for a network for which the apparatus has information.

* * * * *